US012789834B2

(12) United States Patent
Carvalho et al.

(10) Patent No.: US 12,789,834 B2
(45) Date of Patent: Nov. 10, 2026

(54) VISION-BASED MACHINE LEARNING MODEL FOR AGGREGATION OF STATIC OBJECTS AND SYSTEMS FOR AUTONOMOUS DRIVING

(71) Applicant: Tesla, Inc., Austin, TX (US)

(72) Inventors: Micael Carvalho, Austin, TX (US); John Emmons, Austin, TX (US); Patrick Cho, Austin, TX (US); Bradley Emi, Austin, TX (US); Saachi Jain, Austin, TX (US); Nishant Desai, Austin, TX (US); Tony Duan, Austin, TX (US)

(73) Assignee: Tesla, Inc., Austin, TX (US)

( * ) Notice: Subject to any disclaimer, the term of this patent is extended or adjusted under 35 U.S.C. 154(b) by 449 days.

(21) Appl. No.: 17/820,849

(22) Filed: Aug. 18, 2022

(65) Prior Publication Data

US 2023/0053785 A1 Feb. 23, 2023

Related U.S. Application Data

(60) Provisional application No. 63/287,936, filed on Dec. 9, 2021, provisional application No. 63/260,439, filed on Aug. 19, 2021.

(51) Int. Cl.
*B60W 60/00* (2020.01)
*G06T 7/13* (2017.01)
(Continued)

(52) U.S. Cl.
CPC ............ *B60W 60/001* (2020.02); *G06T 7/13* (2017.01); *G06T 7/20* (2013.01); *G06V 10/774* (2022.01);
(Continued)

(58) Field of Classification Search
USPC .......................................................... 382/156
See application file for complete search history.

(56) References Cited

U.S. PATENT DOCUMENTS 6,882,755 B2 4/2005 Silverstein et al.
7,209,031 B2 4/2007 Nakai et al.
(Continued)

FOREIGN PATENT DOCUMENTS

AU 2019261735 A1 6/2020
AU 2019201716 A1 10/2020
(Continued)

OTHER PUBLICATIONS

International Search Report and Written Opinion on PCT Appl. No. PCT/US2022/040784 dated Dec. 7, 2022 (15 pages).
(Continued)

*Primary Examiner* — Chineyere Wills-Burns
*Assistant Examiner* — Aaron Timothy Bonansinga
(74) *Attorney, Agent, or Firm* — Foley & Lardner LLP

(57) ABSTRACT

Systems and methods for a vision-based machine learning model for aggregation of static objects and systems for autonomous driving. An example method includes obtaining images from image sensors positioned about a vehicle. Features associated with the images are determined, with the features being output based on a forward pass through a machine learning model. The features are projected into a vector space associated with a birds-eye view based on the machine learning model. The projected features are aggregated with other projected features associated with prior images. Images depicting static objects in the birds-eye view are output.

19 Claims, 22 Drawing Sheets

(51) Int. Cl.

| | |
|---|---|
| ***G06T 7/20*** | (2017.01) |
| ***G06V 10/774*** | (2022.01) |
| ***G06V 20/56*** | (2022.01) |
| ***G06V 20/58*** | (2022.01) |
| ***G06V 20/70*** | (2022.01) |

(52) U.S. Cl.

CPC .............. *G06V 20/56* (2022.01); *G06V 20/58* (2022.01); *G06V 20/588* (2022.01); *G06V 20/70* (2022.01); *B60W 2420/403* (2013.01); *B60W 2552/53* (2020.02); *G06T 2207/20081* (2013.01); *G06T 2207/30241* (2013.01); *G06T 2207/30252* (2013.01)

(56) References Cited

U.S. PATENT DOCUMENTS 7,391,907 B1 6/2008 Venetianer et al.
7,747,070 B2 6/2010 Puri
7,904,867 B2 3/2011 Burch et al.
7,974,492 B2 7/2011 Nishijima
8,165,380 B2 4/2012 Choi et al.
8,369,633 B2 2/2013 Lu et al.
8,406,515 B2 3/2013 Cheatle et al.
8,509,478 B2 8/2013 Haas et al.
8,588,470 B2 11/2013 Rodriguez et al.
8,744,174 B2 6/2014 Hamada et al.
8,773,498 B2 7/2014 Lindbergh
8,874,266 B1 10/2014 Francis et al.
8,912,476 B2 12/2014 Fogg et al.
8,913,830 B2 12/2014 Sun et al.
8,928,753 B2 1/2015 Han et al.
8,972,095 B2 3/2015 Furuno et al.
8,976,269 B2 3/2015 Duong
9,008,422 B2 4/2015 Eid et al.
9,081,385 B1 7/2015 Ferguson et al.
9,275,289 B2 3/2016 Li et al.
9,586,455 B2 3/2017 Sugai et al.
9,606,539 B1 3/2017 Kentley et al.
9,632,502 B1 4/2017 Levinson et al.
9,672,437 B2 6/2017 McCarthy
9,710,696 B2 7/2017 Wang et al.
9,738,223 B2 8/2017 Zhang et al.
9,754,154 B2 9/2017 Craig et al.
9,767,369 B2 9/2017 Furman et al.
9,965,865 B1 5/2018 Agrawal et al.
10,031,526 B1 7/2018 Li et al.
10,049,328 B2 8/2018 Jiang et al.
10,133,273 B2 11/2018 Linke
10,140,252 B2 11/2018 Fowers et al.
10,140,544 B1 11/2018 Zhao et al.
10,146,225 B2 12/2018 Ryan
10,152,655 B2 12/2018 Krishnamurthy et al.
10,167,800 B1 1/2019 Chung et al.
10,169,680 B1 1/2019 Sachdeva et al.
10,192,016 B2 1/2019 Ng et al.
10,216,189 B1 2/2019 Haynes
10,228,693 B2 3/2019 Micks et al.
10,242,293 B2 3/2019 Shim et al.
10,248,121 B2 4/2019 VandenBerg, III
10,262,218 B2 4/2019 Lee et al.
10,282,623 B1 5/2019 Ziyaee et al.
10,296,828 B2 5/2019 Viswanathan
10,303,961 B1 5/2019 Stoffel et al.
10,310,087 B2 6/2019 Laddha et al.
10,311,312 B2 6/2019 Yu et al.
10,318,848 B2 6/2019 Dijkman et al.
10,325,178 B1 6/2019 Tang et al.
10,331,974 B2 6/2019 Zia et al.
10,338,600 B2 7/2019 Yoon et al.
10,343,607 B2 7/2019 Kumon et al.
10,359,783 B2 7/2019 Williams et al.
10,366,290 B2 7/2019 Wang et al.
10,372,130 B1 8/2019 Kaushansky et al.
10,373,019 B2 8/2019 Nariyambut Murali et al.
10,373,026 B1 8/2019 Kim et al.
10,380,741 B2 8/2019 Yedla et al.
10,394,237 B2 8/2019 Xu et al.
10,395,144 B2 8/2019 Zeng et al.
10,402,646 B2 9/2019 Klaus
10,402,986 B2 9/2019 Ray et al.
10,414,395 B1 9/2019 Sapp et al.
10,423,934 B1 9/2019 Zanghi et al.
10,436,615 B2 10/2019 Agarwal et al.
10,452,905 B2 10/2019 Segalovitz et al.
10,460,053 B2 10/2019 Olson et al.
10,467,459 B2 11/2019 Chen et al.
10,468,008 B2 11/2019 Beckman et al.
10,468,062 B1 11/2019 Levinson et al.
10,470,510 B1 11/2019 Koh et al.
10,474,160 B2 11/2019 Huang et al.
10,474,161 B2 11/2019 Huang et al.
10,474,928 B2 11/2019 Sivakumar et al.
10,489,126 B2 11/2019 Kumar et al.
10,489,972 B2 11/2019 Atsmon
10,497,264 B2 12/2019 Rowell
10,503,971 B1 12/2019 Dang et al.
10,514,711 B2 12/2019 Bar-Nahum et al.
10,528,824 B2 1/2020 Zou
10,529,078 B2 1/2020 Abreu et al.
10,529,088 B2 1/2020 Fine et al.
10,534,854 B2 1/2020 Sharma et al.
10,535,191 B2 1/2020 Sachdeva et al.
10,542,930 B1 1/2020 Sanchez et al.
10,546,197 B2 1/2020 Shrestha et al.
10,546,217 B2 1/2020 Albright et al.
10,552,682 B2 2/2020 Jonsson et al.
10,559,386 B1 2/2020 Neuman
10,565,475 B2 2/2020 Lecue et al.
10,567,674 B2 2/2020 Kirsch
10,568,570 B1 2/2020 Sherpa et al.
10,572,717 B1 2/2020 Zhu et al.
10,574,905 B2 2/2020 Srikanth et al.
10,579,058 B2 3/2020 Oh et al.
10,579,063 B2 3/2020 Haynes et al.
10,579,897 B2 3/2020 Redmon et al.
10,586,280 B2 3/2020 McKenna et al.
10,591,914 B2 3/2020 Palanisamy et al.
10,592,785 B2 3/2020 Zhu et al.
10,599,701 B2 3/2020 Liu
10,599,930 B2 3/2020 Lee et al.
10,599,958 B2 3/2020 He et al.
10,606,990 B2 3/2020 Tuli et al.
10,609,434 B2 3/2020 Singhai et al.
10,614,344 B2 4/2020 Anthony et al.
10,621,513 B2 4/2020 Deshpande et al.
10,627,818 B2 4/2020 Sapp et al.
10,628,432 B2 4/2020 Guo et al.
10,628,686 B2 4/2020 Ogale et al.
10,628,688 B1 4/2020 Kim et al.
10,629,080 B2 4/2020 Kazemi et al.
10,636,161 B2 4/2020 Uchigaito
10,636,169 B2 4/2020 Estrada et al.
10,642,275 B2 5/2020 Silva et al.
10,643,320 B2 5/2020 Lee et al.
10,645,344 B2 5/2020 Marman et al.
10,649,464 B2 5/2020 Gray
10,650,071 B2 5/2020 Asgekar et al.
10,652,565 B1 5/2020 Zhang et al.
10,656,657 B2 5/2020 Djuric et al.
10,657,391 B2 5/2020 Chen et al.
10,657,418 B2 5/2020 Marder et al.
10,657,934 B1 5/2020 Kolen et al.
10,661,902 B1 5/2020 Tavshikar
10,664,750 B2 5/2020 Greene
10,671,082 B2 6/2020 Huang et al.
10,671,886 B2 6/2020 Price et al.
10,678,244 B2 6/2020 Iandola et al.
10,678,839 B2 6/2020 Gordon et al.
10,678,997 B2 6/2020 Ahuja et al.
10,679,129 B2 6/2020 Baker
10,684,626 B1 * 6/2020 Martin ................. G08G 1/0962
10,685,159 B2 6/2020 Su et al.
10,685,188 B1 6/2020 Zhang et al.

(56) References Cited

U.S. PATENT DOCUMENTS 10,692,000 B2 6/2020 Surazhsky et al.
10,692,242 B1 6/2020 Morrison et al.
10,693,740 B2 6/2020 Coccia et al.
10,698,868 B2 6/2020 Guggilla et al.
10,699,119 B2 6/2020 Lo et al.
10,699,140 B2 6/2020 Kench et al.
10,699,477 B2 6/2020 Levinson et al.
10,713,502 B2 7/2020 Tiziani
10,719,759 B2 7/2020 Kutliroff
10,725,475 B2 7/2020 Yang et al.
10,726,264 B2 7/2020 Sawhney et al.
10,726,279 B1 7/2020 Kim et al.
10,726,374 B1 7/2020 Engineer et al.
10,732,261 B1 8/2020 Wang et al.
10,733,262 B2 8/2020 Miller et al.
10,733,482 B1 8/2020 Lee et al.
10,733,506 B1 8/2020 Ogale et al.
10,733,638 B1 8/2020 Jain et al.
10,733,755 B2 8/2020 Liao et al.
10,733,876 B2 8/2020 Moura et al.
10,740,563 B2 8/2020 Dugan
10,740,694 B2 8/2020 Harvill et al.
10,740,914 B2 8/2020 Xiao et al.
10,748,062 B2 8/2020 Rippel et al.
10,748,247 B2 8/2020 Paluri
10,751,879 B2 8/2020 Li et al.
10,755,112 B2 8/2020 Mabuchi
10,755,575 B2 8/2020 Johnston et al.
10,757,330 B2 8/2020 Ashrafi
10,762,396 B2 9/2020 Vallespi et al.
10,768,628 B2 9/2020 Martin et al.
10,768,629 B2 9/2020 Song et al.
10,769,446 B2 9/2020 Chang et al.
10,769,483 B2 9/2020 Nirenberg et al.
10,769,493 B2 9/2020 Yu et al.
10,769,494 B2 9/2020 Xiao et al.
10,769,525 B2 9/2020 Redding et al.
10,776,626 B1 9/2020 Lin et al.
10,776,673 B2 9/2020 Kim et al.
10,776,939 B2 9/2020 Ma et al.
10,779,760 B2 9/2020 Lee et al.
10,783,381 B2 9/2020 Yu et al.
10,783,454 B2 9/2020 Shoaib et al.
10,789,402 B1 9/2020 Vemuri et al.
10,789,544 B2 9/2020 Fiedel et al.
10,790,919 B1 9/2020 Kolen et al.
10,796,221 B2 10/2020 Zhang et al.
10,796,355 B1 10/2020 Price et al.
10,796,423 B2 10/2020 Goja
10,798,368 B2 10/2020 Briggs et al.
10,803,325 B2 10/2020 Bai et al.
10,803,328 B1 10/2020 Bal et al.
10,803,743 B2 10/2020 Abari et al.
10,805,629 B2 10/2020 Liu et al.
10,809,730 B2 10/2020 Chintakindi
10,810,445 B1 10/2020 Kangaspunta
10,816,346 B2 10/2020 Wheeler et al.
10,816,992 B2 10/2020 Chen
10,817,731 B2 10/2020 Vallespi et al.
10,817,732 B2 10/2020 Porter et al.
10,819,923 B1 10/2020 McCauley et al.
10,824,122 B2 11/2020 Mummadi et al.
10,824,862 B2 11/2020 Qi et al.
10,828,790 B2 11/2020 Nemallan
10,832,057 B2 11/2020 Chan et al.
10,832,093 B1 11/2020 Taralova et al.
10,832,414 B2 11/2020 Pfeiffer
10,832,418 B1 11/2020 Karasev et al.
10,833,785 B1 11/2020 O'Shea et al.
10,836,379 B2 11/2020 Xiao et al.
10,838,936 B2 11/2020 Cohen
10,839,230 B2 11/2020 Charette et al.
10,839,578 B2 11/2020 Coppersmith et al.
10,843,628 B2 11/2020 Kawamoto et al.
10,845,820 B2 11/2020 Wheeler
10,845,943 B1 11/2020 Ansari et al.
10,846,831 B2 11/2020 Raduta
10,846,888 B2 11/2020 Kaplanyan et al.
10,853,670 B2 12/2020 Sholingar et al.
10,853,739 B2 12/2020 Truong et al.
10,860,919 B2 12/2020 Kanazawa et al.
10,860,924 B2 12/2020 Burger
10,867,444 B2 12/2020 Russell et al.
10,871,444 B2 12/2020 Al et al.
10,871,782 B2 12/2020 Milstein et al.
10,872,204 B2 12/2020 Zhu et al.
10,872,254 B2 12/2020 Mangia et al.
10,872,326 B2 12/2020 Garner
10,872,531 B2 12/2020 Liu et al.
10,885,083 B2 1/2021 Moeller-Bertram et al.
10,887,433 B2 1/2021 Fu et al.
10,890,898 B2 1/2021 Akella et al.
10,891,715 B2 1/2021 Li
10,891,735 B2 1/2021 Yang et al.
10,893,070 B2 1/2021 Wang et al.
10,893,107 B1 1/2021 Callari et al.
10,896,763 B2 1/2021 Kempanna et al.
10,901,416 B2 1/2021 Khanna et al.
10,901,508 B2 1/2021 Laszlo et al.
10,902,551 B1 1/2021 Mellado et al.
10,908,068 B2 2/2021 Amer et al.
10,908,606 B2 2/2021 Stein et al.
10,909,368 B2 2/2021 Guo et al.
10,909,453 B1 2/2021 Myers et al.
10,915,783 B1 2/2021 Hallman et al.
10,917,522 B2 2/2021 Segalis et al.
10,921,817 B1 2/2021 Kangaspunta
10,922,578 B2 2/2021 Banerjee et al.
10,924,661 B2 2/2021 Vasconcelos et al.
10,928,508 B2 2/2021 Swaminathan
10,929,757 B2 2/2021 Baker et al.
10,930,065 B2 2/2021 Grant et al.
10,936,908 B1 3/2021 Ho et al.
10,937,186 B2 3/2021 Wang et al.
10,943,101 B2 3/2021 Agarwal et al.
10,943,132 B2 3/2021 Wang et al.
10,943,355 B2 3/2021 Fagg et al.
10,990,826 B1 4/2021 Haider et al.
10,997,461 B2 5/2021 Elluswamy et al.
11,126,180 B1 9/2021 Kobilarov
11,157,287 B2 10/2021 Talpes et al.
11,157,441 B2 10/2021 Talpes et al.
11,256,958 B1 2/2022 Subbiah et al.
11,282,235 B2 * 3/2022 Torikura ................ G06V 20/56
11,292,462 B1 4/2022 Karasev et al.
11,295,180 B1 4/2022 Tolstov et al.
11,409,692 B2 8/2022 Das Sarma et al.
11,430,177 B1 8/2022 Lasram et al.
11,447,142 B1 9/2022 Engstrom et al.
11,501,572 B2 11/2022 Naphade et al.
11,507,836 B1 11/2022 Kurz et al.
11,615,223 B2 3/2023 Taralova
11,625,041 B2 4/2023 Das et al.
11,921,824 B1 * 3/2024 Hester .................... G06N 3/045
2003/0035481 A1 2/2003 Hahm
2005/0162445 A1 7/2005 Sheasby et al.
2006/0072847 A1 4/2006 Chor et al.
2006/0098843 A1 5/2006 Chew
2006/0224533 A1 10/2006 Thaler
2006/0280364 A1 12/2006 Ma et al.
2009/0016571 A1 1/2009 Tijerina et al.
2010/0118157 A1 5/2010 Kameyama
2010/0121576 A1 5/2010 Aso et al.
2012/0109915 A1 5/2012 Kamekawa
2012/0110491 A1 5/2012 Cheung
2012/0134595 A1 5/2012 Fonseca et al.
2013/0173150 A1 7/2013 Ghisio
2013/0342692 A1 12/2013 Li et al.
2014/0003709 A1 1/2014 Ranganathan et al.
2014/0093176 A1 4/2014 Maeda et al.
2014/0270362 A1 9/2014 Najafi Shoushtari et al.
2015/0104102 A1 4/2015 Carreira et al.
2016/0003636 A1 * 1/2016 Ng-Thow-Hing ... G01C 21/365
701/418

(56) References Cited

U.S. PATENT DOCUMENTS

2016/0132786 A1 5/2016 Balan et al.
2016/0180197 A1 6/2016 Kim et al.
2016/0307071 A1* 10/2016 Perronnin .............. G06V 10/82
2016/0328856 A1 11/2016 Mannino et al.
2017/0011281 A1 1/2017 Dihkman et al.
2017/0060379 A1 3/2017 Capozella et al.
2017/0132334 A1 5/2017 Levinson et al.
2017/0158134 A1 6/2017 Shigemura
2017/0206434 A1 7/2017 Nariyambut et al.
2018/0012411 A1 1/2018 Richey et al.
2018/0018590 A1 1/2018 Szeto et al.
2018/0039853 A1 2/2018 Liu et al.
2018/0052225 A1 2/2018 Bã-hme et al.
2018/0067489 A1 3/2018 Oder et al.
2018/0068459 A1 3/2018 Zhang et al.
2018/0068540 A1 3/2018 Romanenko et al.
2018/0074506 A1 3/2018 Branson
2018/0121762 A1 5/2018 Han et al.
2018/0150081 A1 5/2018 Gross et al.
2018/0188027 A1 7/2018 Zhang et al.
2018/0189578 A1 7/2018 Yang et al.
2018/0203456 A1* 7/2018 Nagasaka ............. B60W 10/20
2018/0211403 A1 7/2018 Hotson et al.
2018/0308012 A1 10/2018 Mummadi et al.
2018/0314878 A1 11/2018 Lee et al.
2018/0348346 A1* 12/2018 Vallespi-Gonzalez ....................... G01S 7/4802
2018/0349782 A1 12/2018 Zheng et al.
2018/0357492 A1* 12/2018 Allen ..................... G06V 20/52
2018/0357511 A1 12/2018 Misra et al.
2018/0373943 A1 12/2018 Tanigawa et al.
2018/0374105 A1 12/2018 Azout et al.
2019/0005338 A1 1/2019 Watanabe
2019/0011910 A1 1/2019 Lockwood et al.
2019/0023277 A1 1/2019 Roger et al.
2019/0025773 A1 1/2019 Yang et al.
2019/0026250 A1 1/2019 Das Sarma et al.
2019/0042894 A1 2/2019 Anderson
2019/0042919 A1 2/2019 Peysakhovich et al.
2019/0042944 A1 2/2019 Nair et al.
2019/0042948 A1 2/2019 Lee et al.
2019/0049970 A1 2/2019 Djuric et al.
2019/0057314 A1 2/2019 Julian et al.
2019/0065637 A1 2/2019 Bogdoll et al.
2019/0072978 A1 3/2019 Levi
2019/0079526 A1 3/2019 Vallespi et al.
2019/0080602 A1 3/2019 Rice et al.
2019/0095780 A1 3/2019 Zhong et al.
2019/0095946 A1 3/2019 Azout et al.
2019/0096256 A1 3/2019 Rowell
2019/0101914 A1 4/2019 Coleman et al.
2019/0108417 A1 4/2019 Talagala et al.
2019/0122111 A1 4/2019 Min et al.
2019/0130255 A1 5/2019 Yim et al.
2019/0145765 A1 5/2019 Luo et al.
2019/0146497 A1 5/2019 Urtasun et al.
2019/0146519 A1 5/2019 Miura et al.
2019/0147112 A1 5/2019 Gordon
2019/0147250 A1 5/2019 Zhang et al.
2019/0147254 A1 5/2019 Bai et al.
2019/0147255 A1 5/2019 Homayounfar et al.
2019/0147335 A1 5/2019 Wang et al.
2019/0147372 A1 5/2019 Luo et al.
2019/0156134 A1† 5/2019 Krishnan
2019/0156485 A1 5/2019 Pfeiffer
2019/0158784 A1 5/2019 Ahn et al.
2019/0180154 A1 6/2019 Orlov et al.
2019/0185010 A1 6/2019 Ganguli et al.
2019/0189251 A1 6/2019 Horiuchi et al.
2019/0197357 A1 6/2019 Anderson et al.
2019/0204842 A1 7/2019 Jafari et al.
2019/0205402 A1 7/2019 Sernau et al.
2019/0205667 A1 7/2019 Avidan et al.
2019/0217791 A1 7/2019 Bradley et al.
2019/0227562 A1 7/2019 Mohammadiha et al.
2019/0228037 A1 7/2019 Nicol et al.
2019/0230282 A1 7/2019 Sypitkowski et al.
2019/0232955 A1 8/2019 Grimm et al.
2019/0235499 A1 8/2019 Kazemi et al.
2019/0236437 A1 8/2019 Shin et al.
2019/0243371 A1 8/2019 Nister et al.
2019/0244138 A1 8/2019 Bhowmick et al.
2019/0250622 A1 8/2019 Nister et al.
2019/0250626 A1 8/2019 Ghafarianzadeh et al.
2019/0250640 A1 8/2019 O'Flaherty et al.
2019/0251397 A1 8/2019 Tremblay et al.
2019/0258878 A1 8/2019 Koivisto et al.
2019/0266418 A1* 8/2019 Xu ....................... G06V 10/764
2019/0266610 A1 8/2019 Ghatage et al.
2019/0271559 A1 9/2019 Colgate et al.
2019/0272446 A1 9/2019 Kangaspunta et al.
2019/0276041 A1 9/2019 Choi et al.
2019/0279004 A1 9/2019 Kwon et al.
2019/0286652 A1 9/2019 Habbecke et al.
2019/0286972 A1 9/2019 El Husseini et al.
2019/0287028 A1 9/2019 St Amant et al.
2019/0289281 A1 9/2019 Badrinarayanan et al.
2019/0294177 A1 9/2019 Kwon et al.
2019/0294975 A1 9/2019 Sachs
2019/0303759 A1 10/2019 Farabet et al.
2019/0310651 A1 10/2019 Vallespi-Gonzalez et al.
2019/0311290 A1 10/2019 Huang et al.
2019/0318099 A1 10/2019 Carvalho et al.
2019/0325088 A1 10/2019 Dubey et al.
2019/0325266 A1 10/2019 Klepper et al.
2019/0325269 A1 10/2019 Bagherinezhad et al.
2019/0325580 A1 10/2019 Lukac et al.
2019/0325595 A1 10/2019 Stein et al.
2019/0329790 A1 10/2019 Nandakumar et al.
2019/0332875 A1 10/2019 Vallespi-Gonzalez et al.
2019/0333232 A1 10/2019 Vallespi-Gonzalez et al.
2019/0336063 A1 11/2019 Dascalu
2019/0339989 A1 11/2019 Liang et al.
2019/0340462 A1 11/2019 Pao et al.
2019/0340492 A1 11/2019 Burger et al.
2019/0340499 A1 11/2019 Burger et al.
2019/0347501 A1 11/2019 Kim et al.
2019/0349571 A1 11/2019 Herman et al.
2019/0354782 A1 11/2019 Kee et al.
2019/0354786 A1 11/2019 Lee et al.
2019/0354808 A1 11/2019 Park et al.
2019/0354817 A1 11/2019 Shlens et al.
2019/0354850 A1 11/2019 Watson et al.
2019/0367021 A1 12/2019 Zhao et al.
2019/0367022 A1 12/2019 Zhao et al.
2019/0369616 A1 12/2019 Ostafew
2019/0369626 A1 12/2019 Lui et al.
2019/0370398 A1 12/2019 He et al.
2019/0370575 A1 12/2019 Nandakumar et al.
2019/0370935 A1 12/2019 Chang et al.
2019/0373322 A1 12/2019 Rojas-Echenique et al.
2019/0377345 A1 12/2019 Bachrach et al.
2019/0377965 A1 12/2019 Totolos et al.
2019/0378049 A1 12/2019 Widmann et al.
2019/0378051 A1 12/2019 Widmann et al.
2019/0382007 A1 12/2019 Casas et al.
2019/0384303 A1 12/2019 Muller et al.
2019/0384304 A1 12/2019 Towal et al.
2019/0384309 A1 12/2019 Silva et al.
2019/0384994 A1 12/2019 Frossard et al.
2019/0385048 A1 12/2019 Cassidy et al.
2019/0385360 A1 12/2019 Yang et al.
2020/0004259 A1 1/2020 Gulino et al.
2020/0004351 A1 1/2020 Marchant et al.
2020/0012936 A1 1/2020 Lee et al.
2020/0017117 A1 1/2020 Milton
2020/0023836 A1 1/2020 Schneider et al.
2020/0025931 A1 1/2020 Liang et al.
2020/0026282 A1 1/2020 Choe et al.
2020/0026283 A1 1/2020 Barnes et al.
2020/0026992 A1 1/2020 Zhang et al.
2020/0027210 A1 1/2020 Haemel et al.
2020/0033858 A1 1/2020 Xiao
2020/0033865 A1 1/2020 Mellinger et al.

(56) References Cited

U.S. PATENT DOCUMENTS

| | | | |
|---|---|---|---|
| 2020/0034665 | A1 | 1/2020 | Ghanta et al. |
| 2020/0034710 | A1 | 1/2020 | Sidhu et al. |
| 2020/0036948 | A1 | 1/2020 | Song |
| 2020/0039520 | A1 | 2/2020 | Misu et al. |
| 2020/0051550 | A1 | 2/2020 | Baker |
| 2020/0057487 | A1* | 2/2020 | Sicconi .................... G06F 3/011 |
| 2020/0060757 | A1 | 2/2020 | Ben-Haim et al. |
| 2020/0065711 | A1 | 2/2020 | Clément et al. |
| 2020/0065879 | A1 | 2/2020 | Hu et al. |
| 2020/0069973 | A1 | 3/2020 | Lou et al. |
| 2020/0073385 | A1 | 3/2020 | Jobanputra et al. |
| 2020/0074230 | A1 | 3/2020 | Englard et al. |
| 2020/0074266 | A1 | 3/2020 | Peake et al. |
| 2020/0086880 | A1 | 3/2020 | Poeppel et al. |
| 2020/0089243 | A1 | 3/2020 | Poeppel et al. |
| 2020/0089246 | A1 | 3/2020 | Mcgill et al. |
| 2020/0089969 | A1 | 3/2020 | Lakshmi et al. |
| 2020/0090056 | A1 | 3/2020 | Singhal et al. |
| 2020/0097841 | A1 | 3/2020 | Petousis et al. |
| 2020/0098095 | A1 | 3/2020 | Borcs et al. |
| 2020/0103894 | A1 | 4/2020 | Cella et al. |
| 2020/0104705 | A1 | 4/2020 | Bhowmick et al. |
| 2020/0104753 | A1 | 4/2020 | Demiralp et al. |
| 2020/0110416 | A1 | 4/2020 | Hong et al. |
| 2020/0117180 | A1 | 4/2020 | Cella et al. |
| 2020/0117889 | A1 | 4/2020 | Laput et al. |
| 2020/0117916 | A1 | 4/2020 | Liu |
| 2020/0117917 | A1 | 4/2020 | Yoo |
| 2020/0118035 | A1 | 4/2020 | Asawa et al. |
| 2020/0118294 | A1* | 4/2020 | Nakao ........................ G06T 1/20 |
| 2020/0125112 | A1 | 4/2020 | Mao et al. |
| 2020/0125844 | A1 | 4/2020 | She et al. |
| 2020/0125845 | A1 | 4/2020 | Hess et al. |
| 2020/0126129 | A1 | 4/2020 | Lkhamsuren et al. |
| 2020/0126192 | A1 | 4/2020 | Munkberg et al. |
| 2020/0134379 | A1 | 4/2020 | Gaidon et al. |
| 2020/0134427 | A1 | 4/2020 | Oh et al. |
| 2020/0134461 | A1 | 4/2020 | Chai et al. |
| 2020/0134466 | A1 | 4/2020 | Weintraub et al. |
| 2020/0134848 | A1 | 4/2020 | El-Khamy et al. |
| 2020/0143231 | A1 | 5/2020 | Fusi et al. |
| 2020/0143279 | A1 | 5/2020 | West et al. |
| 2020/0148201 | A1 | 5/2020 | King et al. |
| 2020/0149898 | A1 | 5/2020 | Felip et al. |
| 2020/0151201 | A1 | 5/2020 | Chandrasekhar et al. |
| 2020/0151619 | A1 | 5/2020 | Mopur et al. |
| 2020/0151692 | A1 | 5/2020 | Gao et al. |
| 2020/0158822 | A1 | 5/2020 | Owens et al. |
| 2020/0158869 | A1 | 5/2020 | Amirloo et al. |
| 2020/0159225 | A1 | 5/2020 | Zeng et al. |
| 2020/0160064 | A1 | 5/2020 | Wang et al. |
| 2020/0160104 | A1 | 5/2020 | Urtasun et al. |
| 2020/0160117 | A1 | 5/2020 | Urtasun et al. |
| 2020/0160178 | A1 | 5/2020 | Kar et al. |
| 2020/0160532 | A1 | 5/2020 | Urtasun et al. |
| 2020/0160558 | A1 | 5/2020 | Urtasun et al. |
| 2020/0160559 | A1 | 5/2020 | Urtasun et al. |
| 2020/0160598 | A1 | 5/2020 | Manivasagam et al. |
| 2020/0162489 | A1 | 5/2020 | Bar-Nahum et al. |
| 2020/0167438 | A1 | 5/2020 | Herring |
| 2020/0167554 | A1 | 5/2020 | Wang et al. |
| 2020/0174481 | A1 | 6/2020 | Van Heukelom et al. |
| 2020/0175326 | A1 | 6/2020 | Shen et al. |
| 2020/0175354 | A1 | 6/2020 | Volodarskiy et al. |
| 2020/0175371 | A1 | 6/2020 | Kursun |
| 2020/0175401 | A1 | 6/2020 | Shen |
| 2020/0183482 | A1 | 6/2020 | Sebot et al. |
| 2020/0184250 | A1 | 6/2020 | Oko |
| 2020/0184333 | A1 | 6/2020 | Oh |
| 2020/0192389 | A1 | 6/2020 | ReMine et al. |
| 2020/0193313 | A1 | 6/2020 | Ghanta et al. |
| 2020/0193328 | A1 | 6/2020 | Guestrin et al. |
| 2020/0202136 | A1 | 6/2020 | Shrestha et al. |
| 2020/0202196 | A1 | 6/2020 | Guo et al. |
| 2020/0209857 | A1 | 7/2020 | Djuric et al. |
| 2020/0209867 | A1 | 7/2020 | Valois et al. |
| 2020/0209874 | A1 | 7/2020 | Chen et al. |
| 2020/0210717 | A1 | 7/2020 | Hou et al. |
| 2020/0210726 | A1 | 7/2020 | Yang et al. |
| 2020/0210769 | A1 | 7/2020 | Hou et al. |
| 2020/0210777 | A1 | 7/2020 | Valois et al. |
| 2020/0216064 | A1 | 7/2020 | du Toit et al. |
| 2020/0218722 | A1 | 7/2020 | Mai et al. |
| 2020/0218910 | A1 | 7/2020 | Herman |
| 2020/0218979 | A1 | 7/2020 | Kwon et al. |
| 2020/0223434 | A1 | 7/2020 | Campos et al. |
| 2020/0225758 | A1 | 7/2020 | Tang et al. |
| 2020/0226377 | A1 | 7/2020 | Campos et al. |
| 2020/0226430 | A1 | 7/2020 | Ahuja et al. |
| 2020/0238998 | A1 | 7/2020 | Dasalukunte et al. |
| 2020/0242381 | A1 | 7/2020 | Chao et al. |
| 2020/0242408 | A1 | 7/2020 | Kim et al. |
| 2020/0242479 | A1 | 7/2020 | Kim et al. |
| 2020/0242511 | A1 | 7/2020 | Kale et al. |
| 2020/0245654 | A1 | 8/2020 | Zhu et al. |
| 2020/0245869 | A1 | 8/2020 | Sivan et al. |
| 2020/0249685 | A1 | 8/2020 | Elluswamy et al. |
| 2020/0250456 | A1 | 8/2020 | Wang et al. |
| 2020/0250473 | A1 | 8/2020 | Elluswamy et al. |
| 2020/0250515 | A1 | 8/2020 | Rifkin et al. |
| 2020/0250874 | A1 | 8/2020 | Assouline et al. |
| 2020/0257301 | A1 | 8/2020 | Weiser et al. |
| 2020/0257306 | A1 | 8/2020 | Nisenzon |
| 2020/0258057 | A1 | 8/2020 | Farahat et al. |
| 2020/0258380 | A1 | 8/2020 | Wissing et al. |
| 2020/0265247 | A1 | 8/2020 | Musk et al. |
| 2020/0272160 | A1 | 8/2020 | Djuric et al. |
| 2020/0272162 | A1 | 8/2020 | Hasselgren et al. |
| 2020/0272859 | A1 | 8/2020 | Lashyn et al. |
| 2020/0273231 | A1 | 8/2020 | Schied et al. |
| 2020/0279354 | A1 | 9/2020 | Klaiman |
| 2020/0279364 | A1 | 9/2020 | Sarkisian et al. |
| 2020/0279371 | A1 | 9/2020 | Wenzel et al. |
| 2020/0285464 | A1 | 9/2020 | Brebner |
| 2020/0286256 | A1 | 9/2020 | Houts et al. |
| 2020/0293786 | A1 | 9/2020 | Jia et al. |
| 2020/0293796 | A1 | 9/2020 | Sajjadi et al. |
| 2020/0293828 | A1 | 9/2020 | Wang et al. |
| 2020/0293905 | A1 | 9/2020 | Huang et al. |
| 2020/0294162 | A1 | 9/2020 | Shah |
| 2020/0294257 | A1 | 9/2020 | Yoo et al. |
| 2020/0294310 | A1 | 9/2020 | Lee et al. |
| 2020/0297237 | A1 | 9/2020 | Tamersoy et al. |
| 2020/0298891 | A1 | 9/2020 | Liang et al. |
| 2020/0301799 | A1 | 9/2020 | Manivasagam et al. |
| 2020/0302276 | A1 | 9/2020 | Yang et al. |
| 2020/0302291 | A1 | 9/2020 | Hong |
| 2020/0302627 | A1 | 9/2020 | Duggal et al. |
| 2020/0302662 | A1 | 9/2020 | Homayounfar et al. |
| 2020/0304441 | A1 | 9/2020 | Bradley et al. |
| 2020/0306640 | A1 | 10/2020 | Kolen et al. |
| 2020/0307562 | A1 | 10/2020 | Ghafarianzadeh et al. |
| 2020/0307563 | A1 | 10/2020 | Ghafarianzadeh et al. |
| 2020/0307578 | A1 | 10/2020 | Magolan et al. |
| 2020/0309536 | A1 | 10/2020 | Omari et al. |
| 2020/0309923 | A1 | 10/2020 | Bhaskaran et al. |
| 2020/0310442 | A1 | 10/2020 | Halder et al. |
| 2020/0311601 | A1 | 10/2020 | Robinson et al. |
| 2020/0312003 | A1 | 10/2020 | Borovikov et al. |
| 2020/0315708 | A1 | 10/2020 | Mosnier et al. |
| 2020/0320132 | A1 | 10/2020 | Neumann |
| 2020/0324073 | A1 | 10/2020 | Rajan et al. |
| 2020/0327192 | A1 | 10/2020 | Hackman et al. |
| 2020/0327443 | A1 | 10/2020 | Van et al. |
| 2020/0327449 | A1 | 10/2020 | Tiwari et al. |
| 2020/0327662 | A1 | 10/2020 | Liu et al. |
| 2020/0327667 | A1 | 10/2020 | Arbel et al. |
| 2020/0331476 | A1 | 10/2020 | Chen et al. |
| 2020/0334416 | A1 | 10/2020 | Vianu et al. |
| 2020/0334495 | A1 | 10/2020 | Al et al. |
| 2020/0334501 | A1 | 10/2020 | Lin et al. |
| 2020/0334551 | A1 | 10/2020 | Javidi et al. |
| 2020/0334574 | A1 | 10/2020 | Ishida |
| 2020/0337648 | A1 | 10/2020 | Saripalli et al. |

(56) References Cited

U.S. PATENT DOCUMENTS

2020/0339109 A1 10/2020 Hong et al.
2020/0341466 A1 10/2020 Pham et al.
2020/0342350 A1 10/2020 Madar et al.
2020/0342548 A1 10/2020 Mazed et al.
2020/0342652 A1 10/2020 Rowell et al.
2020/0348909 A1 11/2020 Das Sarma et al.
2020/0350063 A1 11/2020 Thornton et al.
2020/0351438 A1 11/2020 Dewhurst et al.
2020/0356107 A1 11/2020 Wells
2020/0356790 A1 11/2020 Jaipuria et al.
2020/0356864 A1 11/2020 Neumann
2020/0356905 A1 11/2020 Luk et al.
2020/0361083 A1 11/2020 Mousavian et al.
2020/0361452 A1 11/2020 Mcgill et al.
2020/0361485 A1 11/2020 Zhu et al.
2020/0364481 A1 11/2020 Kornienko et al.
2020/0364508 A1 11/2020 Gurel et al.
2020/0364540 A1 11/2020 Elsayed et al.
2020/0364746 A1 11/2020 Longano et al.
2020/0364953 A1 11/2020 Simoudis
2020/0372362 A1 11/2020 Kim
2020/0372402 A1 11/2020 Kursun et al.
2020/0380362 A1 12/2020 Cao et al.
2020/0380383 A1 12/2020 Kwong et al.
2020/0393841 A1 12/2020 Frisbie et al.
2020/0394421 A1 12/2020 Yu et al.
2020/0394457 A1 12/2020 Brady
2020/0394495 A1 12/2020 Moudgill et al.
2020/0394813 A1 12/2020 Theverapperuma et al.
2020/0394911 A1* 12/2020 Harmel ................ G05D 1/0287
2020/0396394 A1 12/2020 Zlokolica et al.
2020/0398855 A1 12/2020 Thompson
2020/0401850 A1 12/2020 Bazarsky et al.
2020/0401886 A1 12/2020 Deng et al.
2020/0402155 A1 12/2020 Kurian et al.
2020/0402226 A1 12/2020 Peng
2020/0409364 A1 12/2020 Agrawal
2020/0410012 A1 12/2020 Moon et al.
2020/0410224 A1 12/2020 Goel
2020/0410254 A1 12/2020 Pham et al.
2020/0410288 A1 12/2020 Capota et al.
2020/0410751 A1 12/2020 Omari et al.
2020/0410853 A1 12/2020 Akella et al.
2021/0004014 A1 1/2021 Sivakumar
2021/0004580 A1 1/2021 Sundararaman et al.
2021/0004611 A1 1/2021 Garimella et al.
2021/0004663 A1 1/2021 Park et al.
2021/0006835 A1 1/2021 Slattery et al.
2021/0011908 A1 1/2021 Hayes et al.
2021/0012116 A1 1/2021 Urtasun et al.
2021/0012210 A1 1/2021 Sikka et al.
2021/0012230 A1 1/2021 Hayes et al.
2021/0012239 A1 1/2021 Arzani et al.
2021/0015240 A1 1/2021 Elfakhri et al.
2021/0019215 A1 1/2021 Neeter
2021/0026360 A1 1/2021 Luo
2021/0027112 A1 1/2021 Brewington et al.
2021/0027117 A1 1/2021 McGavran et al.
2021/0030276 A1 2/2021 Li et al.
2021/0031758 A1 2/2021 Urano et al.
2021/0031759 A1 2/2021 Urano et al.
2021/0031760 A1 2/2021 Ostafew et al.
2021/0034921 A1 2/2021 Pinkovich et al.
2021/0035442 A1 2/2021 Baig et al.
2021/0035447 A1 2/2021 Urano et al.
2021/0042575 A1 2/2021 Firner
2021/0042928 A1 2/2021 Takeda et al.
2021/0046954 A1 2/2021 Haynes
2021/0049378 A1 2/2021 Gautam et al.
2021/0049455 A1 2/2021 Kursun
2021/0049456 A1 2/2021 Kursun
2021/0049548 A1 2/2021 Grisz et al.
2021/0049700 A1 2/2021 Nguyen et al.
2021/0053570 A1 2/2021 Akella et al.
2021/0056114 A1 2/2021 Price et al.
2021/0056306 A1 2/2021 Hu et al.
2021/0056317 A1 2/2021 Golov
2021/0056420 A1 2/2021 Konishi et al.
2021/0056701 A1 2/2021 Vranceanu et al.
2021/0094558 A1 4/2021 Garcia et al.
2021/0125057 A1 4/2021 Choi et al.
2021/0150244 A1 5/2021 Segal et al.
2021/0163031 A1 6/2021 Jagbrant et al.
2021/0201145 A1 7/2021 Pham et al.
2021/0224537 A1 7/2021 Inoshita
2021/0232824 A1 7/2021 Shayne et al.
2021/0233390 A1* 7/2021 Georgiou ............. G08G 1/0133
2021/0237769 A1 8/2021 Ostafew
2021/0248490 A1 8/2021 Ma et al.
2021/0263157 A1 8/2021 Zhu
2021/0271259 A1 9/2021 Karpathy
2021/0271898 A1 9/2021 Chen et al.
2021/0276574 A1* 9/2021 Efrat Sela ......... B60W 50/0097
2021/0302992 A1* 9/2021 Chen ...................... G06N 3/045
2021/0303922 A1 9/2021 Tu et al.
2021/0342609 A1* 11/2021 Smolyanskiy ......... G06V 20/58
2021/0347377 A1 11/2021 Siebert et al.
2021/0347383 A1 11/2021 Siebert et al.
2021/0358137 A1* 11/2021 Lee ......................... G06T 7/246
2021/0380099 A1 12/2021 Lee et al.
2021/0406560 A1* 12/2021 Park ...................... G01S 13/862
2022/0044034 A1 2/2022 Roychowdhury et al.
2022/0083785 A1 3/2022 Subramanian et al.
2022/0092349 A1 3/2022 Yang
2022/0105947 A1 4/2022 Postnikov et al.
2022/0153263 A1 5/2022 Hotta et al.
2022/0156525 A1* 5/2022 Guizilini ................ G06N 3/084
2022/0185625 A1 6/2022 One
2022/0227367 A1 7/2022 Kario et al.
2022/0242441 A1 8/2022 Thompson et al.
2022/0299656 A1* 9/2022 Cui ...................... G01C 21/165
2022/0383741 A1 12/2022 Sanchez
2022/0402485 A1 12/2022 Kobilarov et al.
2023/0053785 A1 2/2023 Carvalho et al.
2023/0057509 A1* 2/2023 Emmons ................ G06V 20/58
2023/0085938 A1 3/2023 He et al.
2023/0110027 A1 4/2023 Bajpayee et al.
2023/0267720 A1* 8/2023 Marvasti ............... G01S 7/4802
382/155
2023/0326215 A1 10/2023 Yu et al.
2024/0083419 A1 3/2024 Haruta et al.
2024/0160194 A1 5/2024 Bakhshmand et al.
2024/0174264 A1 5/2024 Wray et al.
2024/0317267 A1 9/2024 Bergquist et al.
2024/0353231 A1 10/2024 Burlina et al.
2024/0355132 A1 10/2024 Duan et al.
2024/0378896 A1 11/2024 Vasudevan et al.
2025/0162612 A1 5/2025 Woelki et al.
2025/0171016 A1 5/2025 Garimella et al.
2025/0242803 A1 7/2025 Brown et al.

FOREIGN PATENT DOCUMENTS

CN 110599537 A 12/2010
CN 102737236 A 10/2012
CN 103366339 A 10/2013
CN 104835114 A 8/2015
CN 103236037 B 5/2016
CN 103500322 B 8/2016
CN 106419893 A 2/2017
CN 106504253 A 3/2017
CN 107031600 A 8/2017
CN 107169421 A 9/2017
CN 107507134 A 12/2017
CN 107885214 A 4/2018
CN 108122234 A 6/2018
CN 107133943 B 7/2018
CN 107368926 B 7/2018
CN 105318888 B 8/2018
CN 108491889 A 9/2018
CN 108647591 A 10/2018
CN 108710865 A 10/2018
CN 105550701 B 11/2018
CN 108764185 A 11/2018

(56) References Cited

FOREIGN PATENT DOCUMENTS

| | | | |
|---|---|---|---|
| CN | 108845574 | A | 11/2018 |
| CN | 108898177 | A | 11/2018 |
| CN | 109086867 | A | 12/2018 |
| CN | 107103113 | B | 1/2019 |
| CN | 109215067 | A | 1/2019 |
| CN | 109359731 | A | 2/2019 |
| CN | 109389207 | A | 2/2019 |
| CN | 109389552 | A | 2/2019 |
| CN | 106779060 | B | 3/2019 |
| CN | 109579856 | A | 4/2019 |
| CN | 109615073 | A | 4/2019 |
| CN | 106156754 | B | 5/2019 |
| CN | 106598226 | B | 5/2019 |
| CN | 106650922 | B | 5/2019 |
| CN | 109791626 | A | 5/2019 |
| CN | 109901595 | A | 6/2019 |
| CN | 109902732 | A | 6/2019 |
| CN | 109934163 | A | 6/2019 |
| CN | 109948428 | A | 6/2019 |
| CN | 109949257 | A | 6/2019 |
| CN | 109951710 | A | 6/2019 |
| CN | 109975308 | A | 7/2019 |
| CN | 109978132 | A | 7/2019 |
| CN | 109978161 | A | 7/2019 |
| CN | 110060202 | A | 7/2019 |
| CN | 110069071 | A | 7/2019 |
| CN | 110084086 | A | 8/2019 |
| CN | 110096937 | A | 8/2019 |
| CN | 110111340 | A | 8/2019 |
| CN | 110135485 | A | 8/2019 |
| CN | 110197270 | B | 9/2019 |
| CN | 110310264 | A | 10/2019 |
| CN | 110321965 | A | 10/2019 |
| CN | 110334801 | A | 10/2019 |
| CN | 110399875 | A | 11/2019 |
| CN | 110414362 | A | 11/2019 |
| CN | 110426051 | A | 11/2019 |
| CN | 110473173 | A | 11/2019 |
| CN | 110516665 | A | 11/2019 |
| CN | 110543837 | A | 12/2019 |
| CN | 110569899 | A | 12/2019 |
| CN | 110599864 | A | 12/2019 |
| CN | 110619282 | A | 12/2019 |
| CN | 110619283 | A | 12/2019 |
| CN | 110619330 | A | 12/2019 |
| CN | 110659628 | A | 1/2020 |
| CN | 110688992 | A | 1/2020 |
| CN | 107742311 | B | 2/2020 |
| CN | 110751280 | A | 2/2020 |
| CN | 110826566 | A | 2/2020 |
| CN | 110909587 | A1 | 3/2020 |
| CN | 107451659 | B | 4/2020 |
| CN | 108111873 | B | 4/2020 |
| CN | 110954111 | A | 4/2020 |
| CN | 110956185 | A | 4/2020 |
| CN | 110966991 | A | 4/2020 |
| CN | 111027549 | A | 4/2020 |
| CN | 111027575 | A | 4/2020 |
| CN | 111047225 | A | 4/2020 |
| CN | 111126453 | A | 5/2020 |
| CN | 111158355 | A | 5/2020 |
| CN | 107729998 | B | 6/2020 |
| CN | 108549934 | B | 6/2020 |
| CN | 111275129 | A | 6/2020 |
| CN | 111275618 | A | 6/2020 |
| CN | 111326023 | A | 6/2020 |
| CN | 111428943 | A | 7/2020 |
| CN | 111444821 | A | 7/2020 |
| CN | 111445420 | A | 7/2020 |
| CN | 111461052 | A | 7/2020 |
| CN | 111461053 | A | 7/2020 |
| CN | 111461110 | A | 7/2020 |
| CN | 110225341 | B | 8/2020 |
| CN | 111307162 | B | 8/2020 |
| CN | 111488770 | A | 8/2020 |
| CN | 111539514 | A | 8/2020 |
| CN | 111565318 | A | 8/2020 |
| CN | 111582216 | A | 8/2020 |
| CN | 111598095 | A | 8/2020 |
| CN | 108229526 | B | 9/2020 |
| CN | 111693972 | A | 9/2020 |
| CN | 106558058 | B | 10/2020 |
| CN | 107169560 | B | 10/2020 |
| CN | 107622258 | B | 10/2020 |
| CN | 111767801 | A | 10/2020 |
| CN | 111768002 | A | 10/2020 |
| CN | 111783545 | A | 10/2020 |
| CN | 111783971 | A | 10/2020 |
| CN | 111797657 | A | 10/2020 |
| CN | 111814623 | A | 10/2020 |
| CN | 111814902 | A | 10/2020 |
| CN | 111860499 | A | 10/2020 |
| CN | 111881856 | A | 11/2020 |
| CN | 111882579 | A | 11/2020 |
| CN | 111897639 | A | 11/2020 |
| CN | 111898507 | A | 11/2020 |
| CN | 111898523 | A | 11/2020 |
| CN | 111899227 | A | 11/2020 |
| CN | 112101175 | A | 12/2020 |
| CN | 112101562 | A | 12/2020 |
| CN | 112115953 | A | 12/2020 |
| CN | 111062973 | B | 1/2021 |
| CN | 111275080 | B | 1/2021 |
| CN | 112183739 | A | 1/2021 |
| CN | 112232497 | A | 1/2021 |
| CN | 112288658 | A | 1/2021 |
| CN | 112308095 | A | 2/2021 |
| CN | 112308799 | A | 2/2021 |
| CN | 112313663 | A | 2/2021 |
| CN | 112329552 | A | 2/2021 |
| CN | 112348783 | A | 2/2021 |
| CN | 111899245 | B | 3/2021 |
| DE | 202017102235 | U1 | 5/2017 |
| DE | 202017102238 | U1 | 5/2017 |
| DE | 102017116017 | A1 | 1/2019 |
| DE | 102018130821 | A1 | 6/2020 |
| DE | 10 2020 003 008 | A1 | 7/2020 |
| DE | 102019008316 | A1 | 8/2020 |
| DE | 10 2020 130 668 | A1 | 5/2021 |
| EP | 1215626 | B1 | 9/2008 |
| EP | 2228666 | B1 | 9/2012 |
| EP | 2420408 | B1 | 5/2013 |
| EP | 2723069 | A1 | 4/2014 |
| EP | 2741253 | A1 | 6/2014 |
| EP | 3115772 | A1 | 1/2017 |
| EP | 2618559 | B1 | 8/2017 |
| EP | 3285485 | A1 | 2/2018 |
| EP | 2863633 | B1 | 2/2019 |
| EP | 3113080 | B1 | 5/2019 |
| EP | 3525132 | A1 | 8/2019 |
| EP | 3531689 | A1 | 8/2019 |
| EP | 3537340 | A1 | 9/2019 |
| EP | 3543917 | A1 | 9/2019 |
| EP | 3608840 | A1 | 2/2020 |
| EP | 3657387 | A1 | 5/2020 |
| EP | 2396750 | B1 | 6/2020 |
| EP | 3664020 | A1 | 6/2020 |
| EP | 3690712 | A1 | 8/2020 |
| EP | 3690742 | A1 | 8/2020 |
| EP | 3722992 | A1 | 10/2020 |
| EP | 3690730 | A2 | 11/2020 |
| EP | 3739486 | A1 | 11/2020 |
| EP | 3501897 | B1 | 12/2020 |
| EP | 3751455 | A2 | 12/2020 |
| EP | 3783527 | A1 | 2/2021 |
| GB | 2402572 | B | 8/2005 |
| GB | 2548087 | A | 9/2017 |
| GB | 2577485 | A | 4/2020 |
| GB | 2517270 | B | 6/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015004922 | A | 1/2015 |

(56) References Cited

FOREIGN PATENT DOCUMENTS

| | | | |
|---|---|---|---|
| JP | 5863536 B2 | 2/2016 | |
| JP | 6044134 B2 | 12/2016 | |
| JP | 2017-078904 A | 4/2017 | |
| JP | 2017-151973 A | 8/2017 | |
| JP | 2017-162436 A | 9/2017 | |
| JP | 6525707 B2 | 6/2019 | |
| JP | 2019101535 A | 6/2019 | |
| JP | 2019-192201 A | 10/2019 | |
| JP | 2020101927 A | 7/2020 | |
| JP | 2020173744 A | 10/2020 | |
| KR | 100326702 B1 | 2/2002 | |
| KR | 101082878 B1 | 11/2011 | |
| KR | 101738422 B1 | 5/2017 | |
| KR | 101969864 B1 | 4/2019 | |
| KR | 101996167 B1 | 7/2019 | |
| KR | 102022388 B1 | 8/2019 | |
| KR | 102043143 B1 | 11/2019 | |
| KR | 102095335 B1 | 3/2020 | |
| KR | 102097120 B1 | 4/2020 | |
| KR | 1020200085490 A | 7/2020 | |
| KR | 102189262 B1 | 12/2020 | |
| KR | 1020200142266 A | 12/2020 | |
| TW | 200630819 A | 9/2006 | |
| TW | I294089 B | 3/2008 | |
| TW | I306207 B | 2/2009 | |
| WO | WO 02/052835 | 7/2002 | |
| WO | WO 16/032398 | 3/2016 | |
| WO | WO 16/048108 | 3/2016 | |
| WO | WO 16/207875 | 12/2016 | |
| WO | WO 17/158622 | 9/2017 | |
| WO | WO 19/005547 | 1/2019 | |
| WO | WO 19/067695 | 4/2019 | |
| WO | WO 19/089339 | 5/2019 | |
| WO | WO 19/092456 | 5/2019 | |
| WO | WO 19/099622 | 5/2019 | |
| WO | WO-2019/089591 A1 | 5/2019 | |
| WO | WO 19/122952 | 6/2019 | |
| WO | WO 19/125191 | 6/2019 | |
| WO | WO 19/126755 | 6/2019 | |
| WO | WO 19/144575 | 8/2019 | |
| WO | WO 19/182782 | 9/2019 | |
| WO | WO 19/191578 | 10/2019 | |
| WO | WO 19/216938 | 11/2019 | |
| WO | WO 19/220436 | 11/2019 | |
| WO | WO 20/006154 | 1/2020 | |
| WO | WO 20/012756 | 1/2020 | |
| WO | WO 20/025696 | 2/2020 | |
| WO | WO 20/034663 | 2/2020 | |
| WO | WO 20/056157 | 3/2020 | |
| WO | WO 20/076356 | 4/2020 | |
| WO | WO 20/097221 | 5/2020 | |
| WO | WO 20/101246 | 5/2020 | |
| WO | WO 20/120050 | 6/2020 | |
| WO | WO 20/121973 | 6/2020 | |
| WO | WO 20/131140 | 6/2020 | |
| WO | WO 20/139181 | 7/2020 | |
| WO | WO 20/139355 | 7/2020 | |
| WO | WO 20/139357 | 7/2020 | |
| WO | WO 20/142193 | 7/2020 | |
| WO | WO 20/146445 | 7/2020 | |
| WO | WO 20/151329 | 7/2020 | |
| WO | WO 20/157761 | 8/2020 | |
| WO | WO 20/163455 | 8/2020 | |
| WO | WO 20/167667 | 8/2020 | |
| WO | WO 20/174262 | 9/2020 | |
| WO | WO 20/177583 | 9/2020 | |
| WO | WO 20/185233 | 9/2020 | |
| WO | WO 20/185234 | 9/2020 | |
| WO | WO 20/195658 | 10/2020 | |
| WO | WO 20/198189 | 10/2020 | |
| WO | WO 20/198779 | 10/2020 | |
| WO | WO 20/205597 | 10/2020 | |
| WO | WO 20/221200 | 11/2020 | |
| WO | WO 20/240284 | 12/2020 | |
| WO | WO 20/260020 | 12/2020 | |
| WO | WO 20/264010 | 12/2020 | |
| WO | WO-2020/245654 A1 | 12/2020 | |

OTHER PUBLICATIONS

International Search Report and Written Opinion on PCT Appl. No. PCT/US2022/040793 dated Nov. 30, 2022 (17 pages).

International Search Report and Written Opinion on PCT Appl. No. PCT/US2022/040906 dated Nov. 18, 2022 (16 pages).

International Preliminary Report on Patentability on PCT/US2022/040784 DTD Feb. 29, 2024 (10 pages).

International Preliminary Report on Patentability on PCT/US2022/040793 DTD Feb. 29, 2024 (10 pages).

International Preliminary Report on Patentability on PCT/US2022/040906 DTD Feb. 29, 2024 (9 pages).

ISR and WO on PCT patent application No. PCT/US2022/040793 dated Oct. 25, 2023 (30 pages).

U.S. Appl. No. 17/820,859, filed Aug. 18, 2022, Emmons et al.

Chen et al., "Simultaneous End-to-End Vehicle and License Plate Detection With Multi-Branch Attention Neural Network," 2020, IEEE Transactions on Intelligent Transportation Systems, vol. 21, Issue 9, 10 Pages.

Hu et al., "SINet: A Scale-Insensitive Convolutional Neural Network for Fast Vehicle Detection," 2019, IEEE Transactions on Intelligent Transportation Systems, vol. 20, Issue 3, 18 Pages.

Kumar et al., "OmniDet: Surround View Cameras Based Multi-Task Visual Perception Network for Autonomous Driving," 2021, IEEE, Robotics and Automation Letters, vol. 6, Issue 2 (8 Pages).

Li et al., "One-Stage Multi-Sensor Data Fusion Convolutional Neural Network for 3D Object Detection," 2019, 18 Pages.

Duzceker, et al., "DeepVideoMVS: Multi-View Stereo on Video with Recurrent Spatio-Temporal Fusion," arXiv:2012.02177, 16 pages (2021).

Li, et al., "One-Stage Multi-Sensor Data Fusion Convolutional Neural Network for 3D Object Detection," Sensors 19(6), 18 pages (2019).

An LSTM-Based Autonomous Driving Model Using a WaymoOpenDataset, Zhicheng Gu et al., MDPI, 2020, pp. 1-14 (Year: 2020).

Jubril Gbolahan Adigun et al., Ground Truth Data for Object Detection in Autonomous Vehicle from a Driving Simulator, 182486IVSM, 2020, Pages V-50 (Year: 2020).

LabelFusion: A Pipeline for Generating Ground Truth Labels for Real RGBD Data of Cluttered Scenes, Pat Marion et al., arxiv, Sep. 26, 2017, pp. 1-8 (Year: 2017).

Real-Time Webcam Heart-Rate and Variability Estimation with Clean Ground Truth for Evaluation, AmoghGudi et al., MDPI, 2020, pp. 1-24 (Year: 2020).

Bojarski, et al., "End to End Learning for Self-Driving Cars," arXiv:1604.07316, 9 pages (2016).

Extended European Search Report on EP Appl. No. 26175336.2 dated Jul. 24, 2026 (12 pages).

Notification of Reasons for Refusal for Japanese Patent App. No. 2024-509357 dated Jun. 30, 2026, 9 pages (with English translation).

Abdellatif, et al., "Active Learning With Noisy Labelers for Improving Classification Accuracy of Connected Vehicles," IEEE Transactions on Vehicular Technology 70(4), pp. 3059-3070 (2021).

Extended European Search Report on EPO App. No. 26179580.1 dated Aug. 20, 2026, 11 pages.

Notification of Reasons for Refusal for JP Patent App. No. 2024-509356 dated Aug. 4, 2026, 6 pages (with translation).

Varma, et al., "IDD: A Dataset for Exploring Problems of Autonomous Navigation in Unconstrained Environments," 2019 IEEE Winter Conference on Applications of Computer Vision (WACV), pp. 1743-1751 (2019).

* cited by examiner
† cited by third party

VISION-BASED MACHINE LEARNING MODEL FOR AGGREGATION OF STATIC OBJECTS AND SYSTEMS FOR AUTONOMOUS DRIVING

CROSS-REFERENCE TO RELATED APPLICATIONS

This application claims priority to U.S. Prov. Patent App. No. 63/260,439 titled "ENHANCED SYSTEMS AND METHODS FOR AUTONOMOUS VEHICLE OPERATION AND TRAINING" and filed on Aug. 19, 2021. This application claims priority to U.S. Prov. Patent App. No. 63/287,936 titled "ENHANCED SYSTEMS AND METHODS FOR AUTONOMOUS VEHICLE OPERATION AND TRAINING" and filed on Dec. 9, 2021. Each of the above-recited applications is hereby incorporated herein by reference in its entirety.

BACKGROUND

Technical Field

The present disclosure relates to machine learning models, and more particularly, to machine learning models using vision information.

Description of Related Art

Neural networks are relied upon for disparate uses and are increasingly forming the underpinnings of technology. For example, a neural network may be leveraged to perform object classification on an image obtained via a user device (e.g., a smart phone). In this example, the neural network may represent a convolutional neural network which applies convolutional layers, pooling layers, and one or more fully-connected layers to classify objects depicted in the image. As another example, a neural network may be leveraged for translation of text between languages. For this example, the neural network may represent a recurrent-neural network.

Complex neural networks are additionally being used to enable autonomous or semi-autonomous driving functionality for vehicles. For example, an unmanned aerial vehicle may leverage a neural network, in part, to enable navigation about a real-world area. In this example, the unmanned aerial vehicle may leverage sensors to detect upcoming objects and navigate around the objects. As another example, a car or truck may execute neural network(s) to navigate about a real-world area. At present, such neural networks may rely upon costly, or error-prone, sensors. Additionally, such neural networks may lack accuracy with respect to detecting and classifying moving and stationary (e.g., fixed) objects causing deficient autonomous or semi-autonomous driving performance.

BRIEF DESCRIPTION OF THE DRAWINGS

FIG. 4O illustrates another example output associated with the birds-eye view network.

Figure 1A:
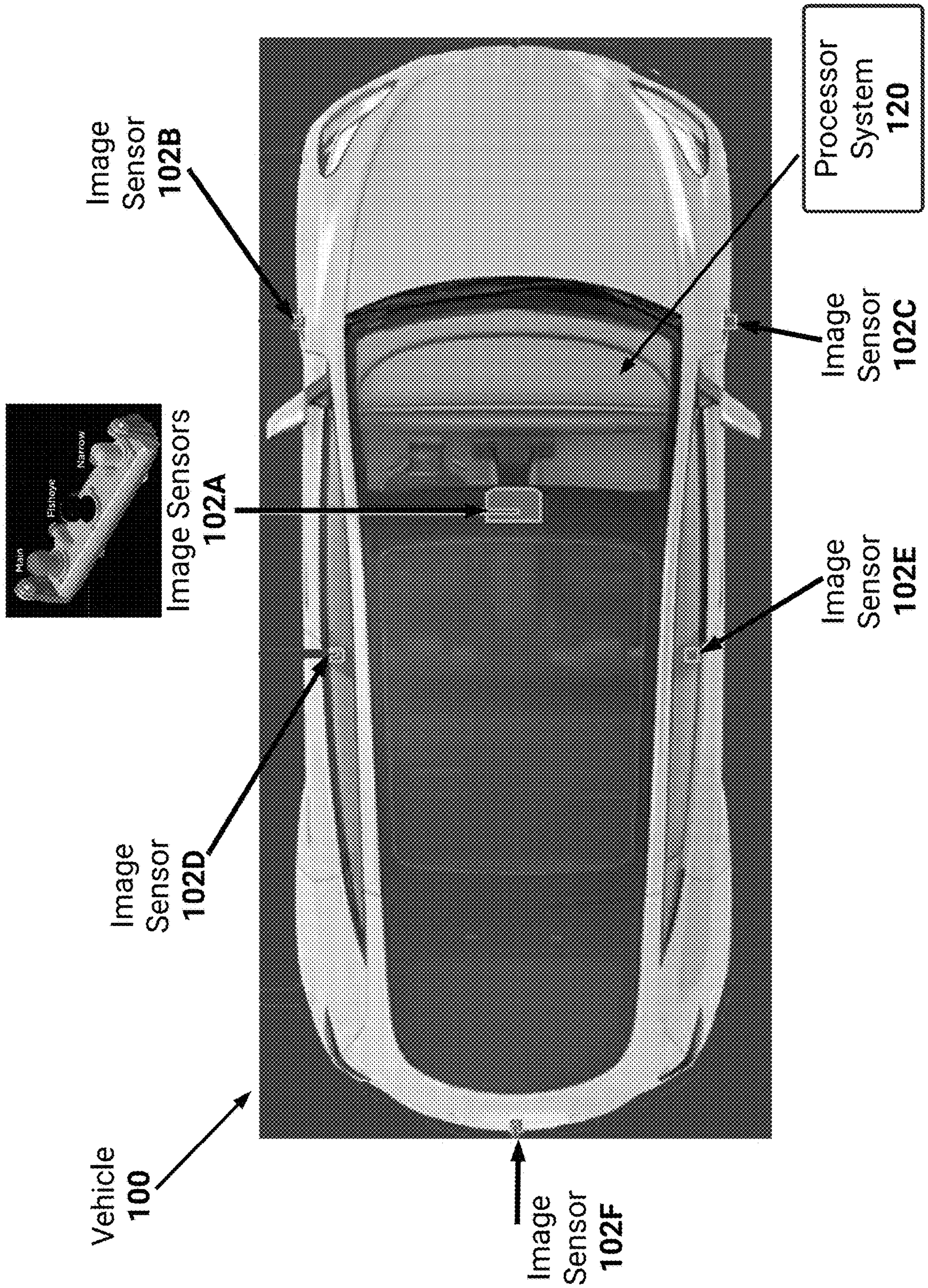
FIG. 1A is a block diagram illustrating an example autonomous or semi-autonomous vehicle which includes a multitude of image sensors an example processor system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Introduction

This application describes enhanced techniques for autonomous or semi-autonomous (collectively referred to herein as autonomous) driving of a vehicle using image sensors (e.g., cameras) positioned about the vehicle. Thus, the vehicle may navigate about a real-world area using vision-based sensor information. As may be appreciated, humans are capable of driving vehicles using vision and a deep understanding of their real-world surroundings. For example, humans are capable of rapidly identifying objects (e.g., pedestrians, road signs, lane markings, vehicles) and using these objects to inform driving of vehicles. Increasingly, machine learning models are capable of identifying and characterizing objects positioned about vehicles. However, such machine learning models are prone to errors introduced through unsophisticated models and/or inconsistencies introduced through disparate sensors.

This application therefore describes a vision-based machine learning model which relies upon increased software complexity to enable a reduction in sensor-based hardware complexity while enhancing accuracy. For example, only image sensors may be used in some embodiments. Through use of image sensors, such as cameras, the described model enables a sophisticated simulacrum of human vision-based driving. As will be described, the machine learning model may obtain images from the image sensors and combine (e.g., stitch or fuse) the information included therein. For example, the information may be combined into a vector space which is then further processed by the machine learning model to extract objects, signals associated with the objects, and so on.

In contrast, another example technique may include identifying objects included in images from each image sensor. These objects may then be aggregated to determine a consistent set of objects in the images. For example, a first image sensor (e.g., a left image sensor) may depict a portion of a truck positioned to the left of a vehicle. In this example, a second image sensor (e.g., a front wide-angle sensor) may include another portion of the truck. Thus, this example technique may require that the portions of the truck be separately identified and then combined into a view of the truck. Such a combination may rely upon hand-tuned models and code which may introduce errors and be difficult to update. In contrast, the techniques described herein allow for the machine learning model to detect objects based on the vector space described above. For example, the machine learning model may effectuate a unified prediction, doing the job of stitching these different views internally by interpreting all images as one.

Furthermore, and as will be described, to limit occlusion of objects and ensure substantial range of visibility of objects, the information may be projected in a vector space according to a birds-eye view. As described herein, the birds-eye view represents a view of a real-world environment about a vehicle in which a virtual camera is pointing downwards at a particular height. Thus, objects positioned about the vehicle are projected into this birds-eye view vector space effectuating the accurate identification of certain types of objects.

As may be appreciated, the birds-eye view may include objects within a threshold distance of the vehicle. For certain types of objects, this type of projection view may be advantageous to an understanding of the real-world environment. In some embodiments, the described model may identify, or determine information regarding, static objects or static information associated with the real-world environment. Example static objects or information may include lane markings, crosswalks, bike lanes, direction of travel for a road or lane therein, intersections, connectivity between lanes which are separated via an intersection, and so on. Additionally, static information may include visibility information (e.g., measures associated with what the image sensors can see). This visibility information may include moving objects in some embodiments, for example if another vehicle is occluding a portion of a road the visibility information may indicate that this portion of not visible.

Without being constrained by way of example, a static object may represent a real-world object, marking, indicator, sign, feature, or characteristic of a real-world environment (e.g., direction of travel in a lane), which is expected to be substantially the same or generally unaltered as an autonomous vehicle navigates. A static object may also represent an object or information which is not a vulnerable or non-vulnerable road user (e.g., a vehicle, a person, a biker, a stroller, and so on). As an example, a lane may be expected to have traffic flow in a same direction as the autonomous vehicle navigates proximate to that lane. In this example, and as may be appreciated, a governmental officer (e.g., a police officer), or sign, may temporarily adjust the direction of traffic. This temporary adjustment may represent a feature or characteristic of the real-world environment and thus may be a static object or information which is detectable via the machine learning model described herein.

With respect to the above-example static objects, the birds-eye view may allow for a rapid understanding of important elements which are relied upon to effectuate autonomous driving. Indeed, stationary objects may inform the outlines of what is navigable in a real-world environment. For example, lane markings can be included in the birds-eye view as would be seen on a navigation map. In this example, the lane markings may be relied upon to inform future navigation options which are available to an autonomous vehicle. As another example, a bike-lane may be identified in the birds-eye view. For this example, the route of the bike-lane may be determined based on the image sensors positioned about the vehicle and updated as the autonomous vehicle navigates. In this way, and as one example, the vehicle may monitor for locations at which the bike-lane merges with vehicle lanes.

The birds-eye view may thus aggregate static objects which are detected proximate (e.g., in visual range) of an autonomous vehicle.

The birds-eye view network described herein may include disparate elements which, in some embodiments, may be end-to-end trained. As will be described, images from image sensors may be provided to respective backbone networks. In some embodiments, these backbone networks may be convolutional neural networks which output feature maps for use later in the network. A transformer network, such as a self-attention network, may receive the feature maps and transform the information into an output vector space. A feature queue may then push the output from the transformer network, optionally along with kinematics of a vehicle (e.g., an autonomous vehicle), into a queue which is optionally spatially indexed. Output from the feature queues may be provided to one or more video modules (e.g., video queues) for processing. In some embodiments, a video module may be a convolutional neural network, a recurrent neural network, or a transformer network. Trunks of the birds-eye view network may then obtain output, or a particular portion thereof, from the video module and generate output information using respective heads. Example output information is described in more detail below with respect to, at least, FIGS. 4A-4O.

As described above, the feature queue may be spatially indexed. As may be appreciated, static information may not be expected to be temporally variable. For example, a road lane may be expected to be the same as the vehicle moves spatially forward. In contrast, other vehicles, pedestrians, and so on, may be expected to vary in time due to their own movements. Thus, the feature queue may be spatially indexed such that information is aggregated over the previous threshold distance. In this way, if the vehicle is stuck in traffic and not moving then the vehicle may maintain its consistent view of the real-world environment as determined according to recent spatial movements.

Thus, the disclosed technology allows for enhancements to autonomous driving models while reducing sensor-complexity. For example, other sensors (e.g., radar, Lidar, and so on) may be removed during operation of the vehicles described herein. As may be appreciated, radar may introduce faults during operation of vehicles which may lead to phantom objects being detected. Additionally, lidar may introduce errors in certain weather conditions and lead to substantial manufacturing complexity in vehicles.

While description related to an autonomous vehicle (e.g., a car) is included herein, as may be appreciated the techniques may be applied to other autonomous vehicles. For example, the machine learning model described herein may be used, in part, to autonomously operate unmanned ground vehicles, unmanned aerial vehicles, and so on. Additionally, reference to an autonomous vehicle may, in some embodiments, represent a vehicle which may be placed into an autonomous driving mode. For example, the vehicle may autonomously drive or navigate on a highway, freeway, and so on. In some embodiments, the vehicle may autonomously drive or navigate on city roads.

Block Diagram—Vehicle Processing System/Birds-Eye View Network

FIG. 1A is a block diagram illustrating an example autonomous vehicle 100 which includes a multitude of image sensors 102A-102F and an example processor system 120. The image sensors 102A-102F may include cameras which are positioned about the vehicle 100. For example, the cameras may allow for a substantially 360-degree view around the vehicle 100.

The image sensors 102A-102F may obtain images which are used by the processor system 120 to, at least, determine information associated with objects positioned proximate to the vehicle 100. The images may be obtained at a particular frequency, such as 30 Hz, 36 Hz, 60 Hz, 65 Hz, and so on. In some embodiments, certain image sensors may obtain images more rapidly than other image sensors. As will be described below, these images may be processed by the processor system 120 based on the vision-based machine learning model described herein.

Image sensor A 102A may be positioned in a camera housing near the top of the windshield of the vehicle 100. For example, the image sensor A 102A may provide a forward view of a real-world environment in which the vehicle is driving. In the illustrated embodiment, image sensor A 102A includes three image sensors which are laterally offset from each other. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow-view lens. In this way, three images of varying focal lengths may be obtained in the forward direction by the vehicle 100.

Image sensor B 102B may be rear-facing and positioned on the left side of the vehicle 100. For example, image sensor B 102B may be placed on a portion of the fender of the vehicle 100. Similarly, Image sensor C 102C may be rear-facing and positioned on the right side of the vehicle 100. For example, image sensor C 102C may be placed on a portion of the fender of the vehicle 100.

Image sensor D 102D may be positioned on a door pillar of the vehicle 100 on the left side. This image sensor 102D may, in some embodiments, be angled such that it points downward and, at least in part, forward. In some embodiments, the image sensor 102D may be angled such that it points downward and, at least in part, rearward. Similarly, image sensor E 102E may be positioned on a door pillow of the vehicle 100 on the right side. As described above, image sensor E 102E may be angled such that it points downwards and either forward or rearward in part.

Image sensor F 102F may be positioned such that it points behind the vehicle 100 and obtains images in the rear direction of the vehicle 100 (e.g., assuming the vehicle 100 is moving forward). In some embodiments, image sensor F 102F may be placed above a license plate of the vehicle 100.

While the illustrated embodiments include image sensors 102A-102F, as may be appreciated additional, or fewer, image sensors may be used and fall within the techniques described herein.

The processor system 120 may obtain images from the image sensors 102A-102F and detect objects, and information associated with the objects, using the vision-based machine learning model described herein. Based on the objects, the processor system 120 may adjust one or more driving characteristics or features. For example, the processor system 120 may cause the vehicle 100 to turn, slow down, brake, speed up, and so on. While not described herein, as may be appreciated the processor system 120 may execute one or more planning and/or navigation engines or models which use output from the vision-based machine learning model to effectuate autonomous driving.

In some embodiments, the processor system 120 may include one or more matrix processors which are configured to rapidly process information associated with machine learning models. The processor system 120 may be used, in some embodiments, to perform convolutions associated with forward passes through a convolutional neural network. For example, input data and weight data may be convolved. The processor system 120 may include a multitude of multiply-accumulate units which perform the convolutions. As an example, the matrix processor may use input and weight data which has been organized or formatted to facilitate larger convolution operations.

For example, input data may be in the form of a three-dimensional matrix or tensor (e.g., two-dimensional data across multiple input channels). In this example, the output data may be across multiple output channels. The processor system 120 may thus process larger input data by merging, or flattening, each two-dimensional output channel into a vector such that the entire, or a substantial portion thereof, channel may be processed by the processor system 120. As another example, data may be efficiently re-used such that weight data may be shared across convolutions. With respect to an output channel, the weight data 106 may represent weight data (e.g., kernels) used to compute that output channel.

Additional example description of the processor system, which may use one or more matrix processors, is included in U.S. Pat. Nos. 11,157,287, 11,409,692, and 11,157,441, which are hereby incorporated by reference in their entirety and form part of this disclosure as if set forth herein.

Figure 1B:
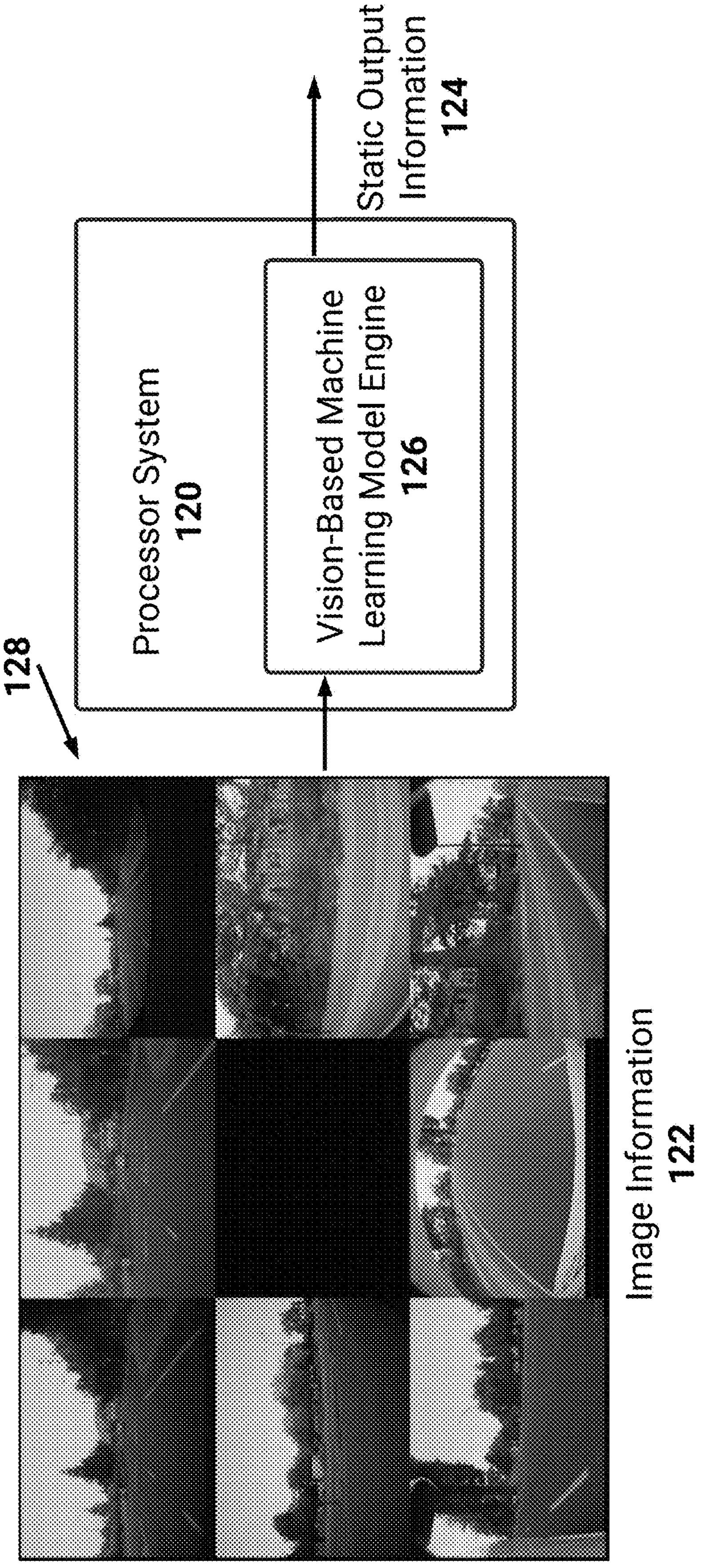
FIG. 1B is a block diagram illustrating the example processor system determining static information based on received image information from the example image sensors.

FIG. 1B is a block diagram illustrating the example processor system 120 determining static information 124 based on received image information 122 from the example image sensors described above.

The image information 122 includes images from image sensors positioned about a vehicle (e.g., vehicle 100). In the illustrated example of FIG. 1A, there are 8 image sensors and thus 8 images are represented in FIG. 1B. For example, a top row of the image information 122 includes three images from the forward-facing image sensors. As described above, the image information 122 may be received at a particular frequency such that the illustrated images represent a particular time stamp of images. In some embodiments, the image information 122 may represent high dynamic range (HDR) images. For example, different exposures may be combined to form the HDR images. As another example, the images from the image sensors may be pre-processed to convert them into HDR images (e.g., using a machine learning model).

In some embodiments, each image sensor may obtain multiple exposures each with a different shutter speed or integration time. For example, the different integration times may be greater than a threshold time difference apart. In this example, there may be three integration times which are, in some embodiments, about an order of magnitude apart in time. The processor system 120, or a different processor, may select one of the exposures based on measures of clipping associated with images. In some embodiments, the processor system 120, or a different processor may form an image based on a combination of the multiple exposures. For example, each pixel of the formed image may be selected from one of the multiple exposures based on the pixel not including values (e.g., red, green, blue) values which are clipped (e.g., exceed a threshold pixel value).

The processor system 120 may execute a vision-based machine learning model engine 126 to process the image information 122. An example of the vision-based machine learning model is described in more detail below, with respect to FIGS. 2-3B. As described herein, the vision-based machine learning model may combine information included in the images. For example, each image may be provided to a particular backbone network. In some embodiments, the backbone networks may represent convolutional neural networks. Outputs of these backbone networks may then, in some embodiments, be combined (e.g., formed into a tensor) or may be provided as separate tensors to one or more further portions of the model. In some embodiments, an attention network (e.g., cross-attention) may receive the combination or may receive input tensors associated with each image sensor.

The combined output, as will be described, may then be used to determine disparate static output information 124 associated with a real-world environment. Example output information 124 may be provided as a birds-eye view of the real-world environment and include, for example, information related to one or more of edges, lines, dividers, islands, intersections, drivable space, restricted regions, road blockages, traffic flow (e.g., directions of travel for each lane proximate to an autonomous vehicle), crosswalks, visibility, and so on. In some embodiments, the output information may form respective images which embody or otherwise encode at least a portion of the above-described output information. For example, an image depicting islands (e.g., illustrated in FIG. 4C) may be formed by the engine 126. In this example, pixels may be assigned colors depending on a probability or likelihood value of the pixel being associated with an island.

Additionally, and as will be described, the vision-based machine learning model engine 126 may aggregate information which is spread across time and/or space. For example, a video module may be used to aggregate information which is determined as the autonomous vehicle navigates in a real-world environment. In this example, the information may be aggregated over a prior amount of drivable space. As an example, static information may be expected to remain substantially similar (e.g., a road line is not expected to suddenly change). Thus, a specific road line feature (e.g., a specific portion of a road line in the real-world environment) may be spatially indexed such that it is maintained via the video module until the autonomous vehicle is greater than a threshold distance away from the road line feature (e.g., 50 meters, 80 meters, 100 meters, 150 meters, and so on). In this say, static information (e.g., static objects) may be tracked such that the processor system 120 monitors their location even when temporarily occluded or if substantial time has passed (e.g., the autonomous vehicle is sitting in traffic, at a stop-light, and so on).

Figure 2:
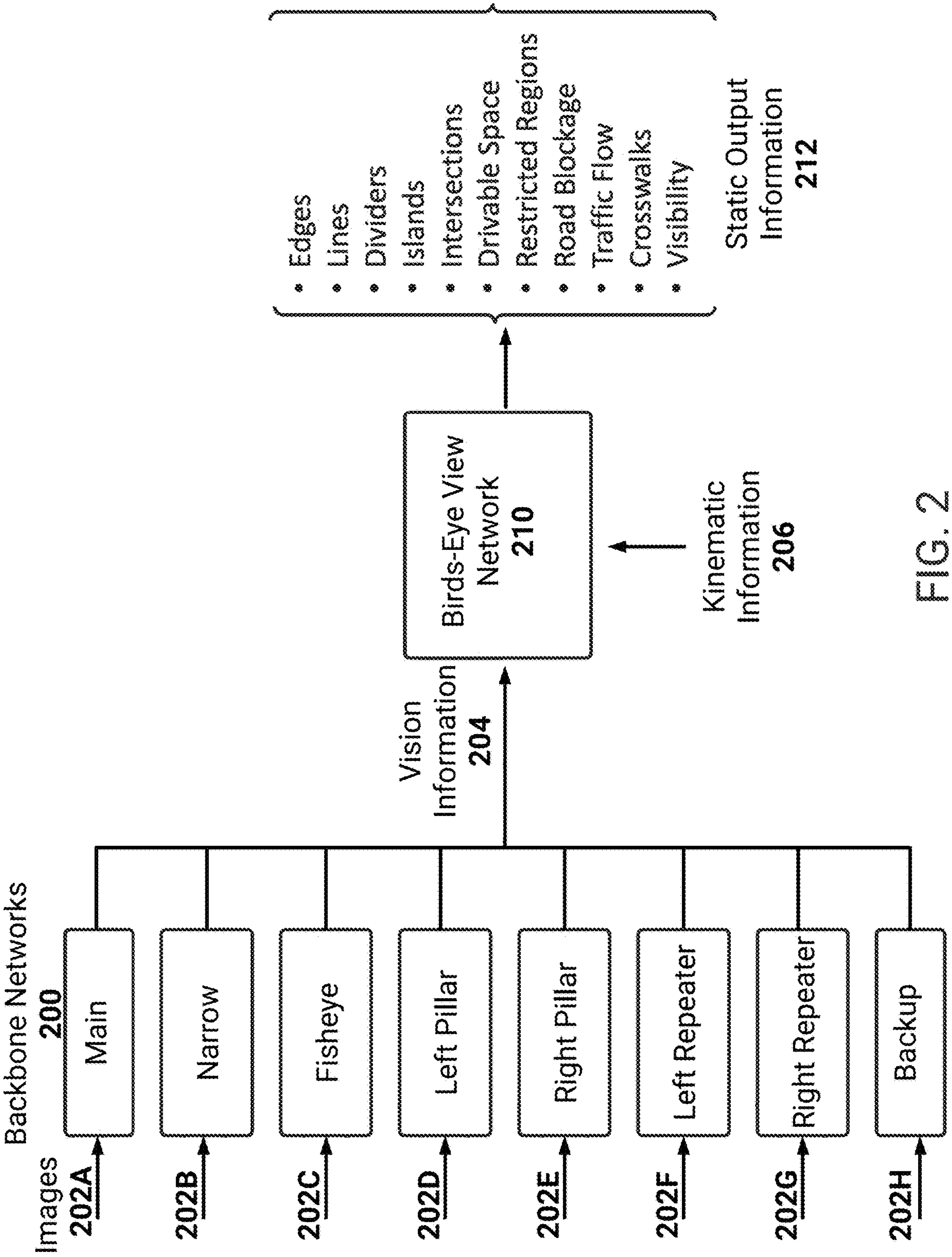
FIG. 2 is a block diagram of an example vision-based machine learning model which includes an example birds-eye view network.

FIG. 2 is a block diagram of an example vision-based machine learning model which includes a birds-eye view network 210. The example model may be executed by an autonomous vehicle, such as vehicle 100. Thus, actions of the model may be understood to be performed by a processor system (e.g., system 120) included in the vehicle. Example output 212 is included in FIG. 2, and as may be appreciated, the output may be indicative of types of output from the network 210. Example graphical representations of the output 212 is included in FIGS. 4A-4O.

In the illustrated example, images 202A-202H are received by the vision-based machine learning model. These images 202A-202H may be obtained from image sensors positioned about the vehicle, such as image sensors 102A-102F. The vision-based machine learning model includes backbone networks 200 which receive respective images as input. Thus, the backbone networks 200 process the raw pixels included in the images 202A-202H. In some embodiments, the backbone networks 200 may be convolutional neural networks. For example, there may be 5, 10, 15, and so on, convolutional layers in each backbone network. In some embodiments, the backbone networks 200 may include residual blocks, recurrent neural network-regulated residual networks, and so on. Additionally, the backbone networks 200 may include weighted bi-directional feature pyramid networks (BiFPN). Output of the BiFPNs may represent multi-scale features determined based on the images 202A-202H. In some embodiments, Gaussian blur may be applied to portions of the images at training and/or inference time. For example, road edges may be peaky in that they are sharply defined in images. In this example, a Gaussian blur may be applied to the road edges to allow for bleeding of visual information such that they may be detectable by a convolutional neural network.

Additionally, certain of the backbone networks 200 may pre-process the images such as performing rectification, cropping, and so on. With respect to cropping, images 202C from the fisheye forward-facing lens may be vertically cropping to remove certain elements included on a windshield (e.g., a glare shield).

With respect to rectification, the vehicles described herein may be examples of vehicles which are available to millions, or more, end-users. Due to tolerances in manufacturing and/or differences in use of the vehicles, the image sensors in the vehicles may be angled, or otherwise positioned, slightly differently (e.g., differences in roll, pitch, and/or yaw). Additionally, different models of vehicles may execute the same vision-based machine learning model. These different models may have the image sensors positioned and/or angled differently. The vision-based machine learning model described herein may be trained, at least in part, using information aggregated from the vehicle fleet used by end-users. Thus, differences in point of view of the images may be evident due to the slight distinctions between the angles, or positions, of the image sensors in the vehicles included in the vehicle fleet.

Thus, rectification may be performed via the backbone networks 200 to address these differences. For example, a transformation (e.g., an affine transformation) may be applied to the images 202A-202H, or a portion thereof, to normalize the images. In this example, the transformation may be based on camera parameters associated with the image sensors (e.g., image sensors 102A-102F), such as extrinsic and/or intrinsic parameters. In some embodiments, the image sensors may undergo an initial, and optionally repeated, calibrated step. For example, as a vehicle drives the cameras may be calibrated to ascertain camera parameters which may be used in the rectification process. In this example, specific markings (e.g., road lines) may be used to inform the calibration. The rectification may optionally represent one or more layers of the backbone networks 200, in which values for the transformation are learned based on training data.

The backbone networks 200 may thus output feature maps (e.g., tensors) which are used by birds-eye view network 210. In some embodiments, the output from the backbone networks 200 may be combined into a matrix or tensor. In some embodiments, the output may be provided as a multitude of tensors (e.g., 8 tensors in the illustrated example) to the birds-eye view net. In the illustrated example, the output is referred to as vision information 204 which is input into the network 210. While the backbone networks 200 and birds-eye view network 210 are illustrated separately, in some embodiments they may form part of the same network or model (e.g., the vision-based model described herein). Additionally, in some embodiments the backbone networks 200 and birds-eye view network 210 may be end-to-end trained.

The output tensors from the backbone networks 200 may be combined (e.g., fused) together into a virtual camera space (e.g., a vector space) via the birds-eye view network 210. The image sensors positioned about the autonomous vehicle may be at different heights of the vehicle. For example, the left and rear pillar image sensors may be positioned higher than the left and rear front bumper image sensors. Thus, to allow for a consistent view of objects positioned about the vehicle, the virtual camera space may be used. In the example described herein, the virtual camera space is a birds-eye view (e.g., top-down view) of static objects positioned about the autonomous vehicle. In some embodiments, the birds-eye view may extend laterally by about 70 meters, 80 meters, 100 meters, and so on. In some embodiments, the birds-eye view may extend longitudinally by about 80 meters, 100 meters, 120 meters, 150 meters, and so on. For example, the birds-eye view may include static objects which are positioned in a real-world environment in the lateral and/or longitudinal distance.

For certain information determined by the vision-based machine learning model, the autonomous vehicle's kinematic information 206 may be used. Example kinematic information 206 may include the autonomous vehicles velocity, acceleration, yaw rate, and so on. In some embodiments, the images 202A-202H may be associated with kinematic information 206 determined for a time, or similar time, at which the images 202A-202H were obtained. For example, the kinematic information 206, such as velocity, yaw rate, acceleration, may be encoded (e.g., embedded into latent space), and associated with the images.

Example static output information 212 from the birds-eye view network 210 is indicated in FIG. 2. The output information 212 may represent information associated with static objects in the real-world environment about the autonomous vehicle. For example, the output information 212 may include information associated with edges (e.g., road edge, such as sidewalk edge, curb edge, and so on). In this example, the information may indicate positions of the edges in the birds-eye view (e.g., positions with respect to the output vector space) of the edges. In some embodiments, the information 212 may be reflected in an image which is formed based on the output from the network 210. For example, a pixel of an image may be assigned a color based on a likelihood, or value indicative of a probability, of the pixel being an edge. In this example, the color may be a grayscale color selected based on the likelihood or value.

Figure 4A:
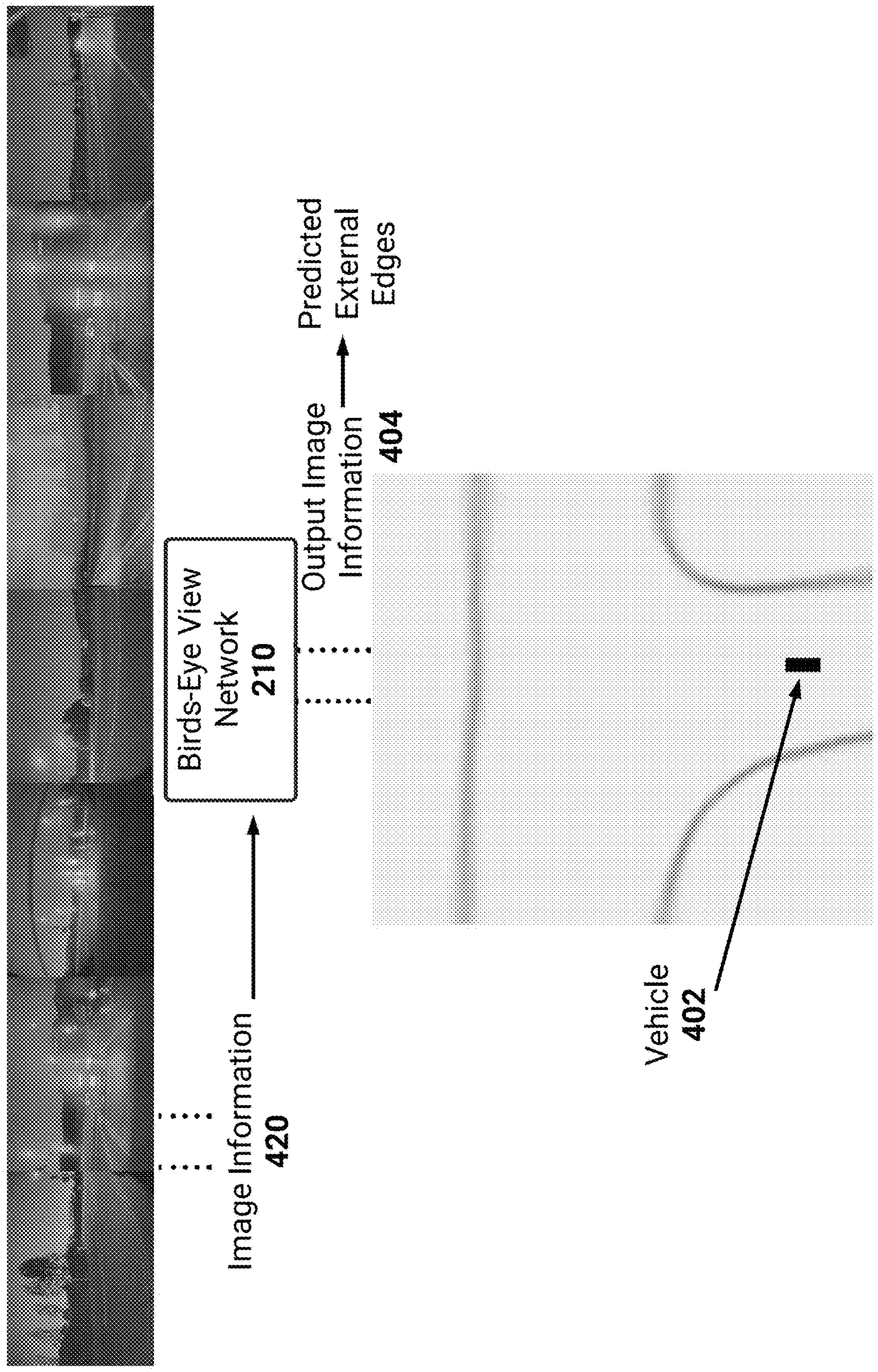
FIG. 4A illustrates an example output associated with the birds-eye view network.

Additional output 212 may include positions or locations associated with lines, dividers, islands, intersections, drivable space, restricted regions, road blockage, crosswalks, and so on. Furthermore, the output 212 may indicate traffic flow information. For example, and as illustrated in FIG. 4J, the output 212 may indicate directions of traffic flow for road lanes proximate to the autonomous vehicle. In some embodiments, the output 212 may assign a color, or variations of a color, depending on the direction of traffic. Thus, traffic flowing east may be assigned a color different from traffic flowing west or south. The output 212 may additionally indicate visibility information, indicating portions of the real-world environment which are not visible to the vehicle (e.g., due to occlusions, weather, and so on).

As will be described, the output 212 may be generated via a forward pass through the birds-eye view network 210. In some embodiments, forward passes may be computed at a particular frequency (e.g., 24 Hz, 30 Hz, and so on). In some embodiments, the output may represent 50, 100, 150, different outputs which indicate different static information associated with the real-world environment. This information may be used, for example, via a planning engine. As an example, the planning engine may determine driving actions to be performed by the autonomous vehicle (e.g., accelerations, turns, braking, and so on) based on the birds-eye view of the real-world environment.

In some embodiments, map information may be provided as an input to the birds-eye view network 210. For example, a raster or image of a map proximate to a location of the autonomous vehicle may be provided as an input. The birds-eye view network 210 may be trained to use this information to generate at least a portion of the outputs described herein. For example, the map information may include a representation of roads, lanes included in the roads, medians, islands, bike lanes, crosswalks, intersections, and so on, which are proximate to the vehicle. In this example, the birds-eye view network 210 may use the map information, for example, to determine which lanes connect to which other lanes (e.g., across an intersection).

Further detail regarding the birds-eye view network 210 is included below with respect to FIGS. 3A-3B.

Figure 3A:
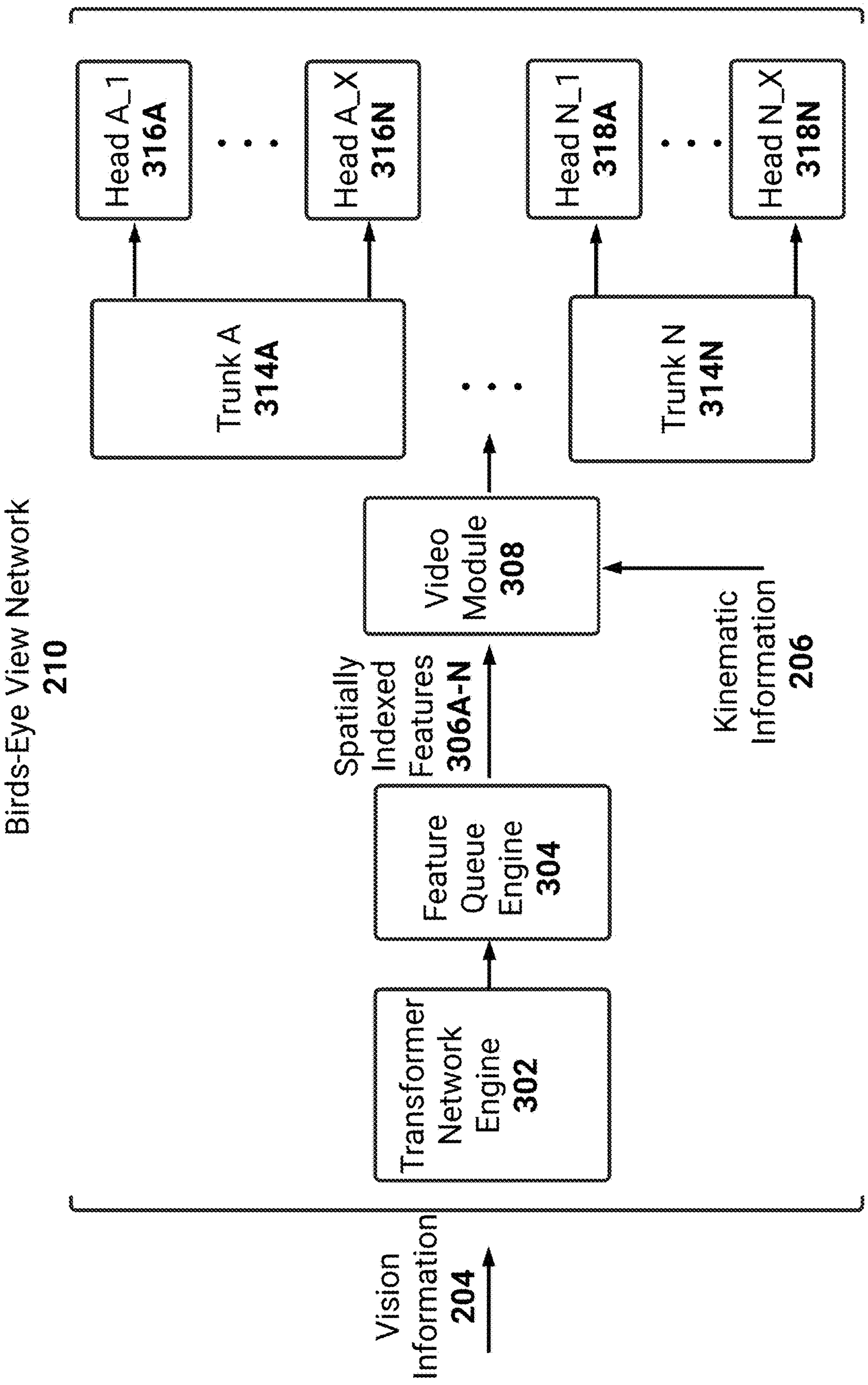
FIG. 3A is a block diagram illustrating detail of the example birds-eye view network.

FIG. 3A is a block diagram illustrating detail of the example birds-eye view network 210. In the illustrated embodiment, vision information 204 is received by the birds-eye view network 210. The vision information 204, as described above, may represent output from the backbone networks 200. Example output may include features (e.g., multi-scale features, feature maps, and so on) determined based on received images.

A transformer network engine 402 receives the vision information 204 as input. In some embodiments, the transformer network engine 402 is trained to project the information 204 into a virtual camera space. For example, the transformer network engine 402 may perform multi-camera fusion and project information into a birds-eye view camera space. For example, during training the engine 402 may be trained to associate objects detected in images as being positioned within the virtual camera space. In this example, the training data may indicate positions of objects as projected into the view desired (e.g., the birds-eye view). Thus, during training the loss function may cause updating of weights of the model such that the projection into the birds-eye view vector space is effectuated.

Output from the transformer network engine 302 is provided as input to the feature queue engine 304. To ensure that objects can be tracked as an autonomous vehicle navigates, even while temporarily occluded, the feature queue engine 304 can store output from the engine 302. For example, the output may be pushed into the queue 304 according to time and/or space. In this example, the time indexing may indicate that the queue 304 stores output from the engine 302 based on passage of time (e.g., information is pushed at a particular frequency). Spatial indexing may indicate that the queue 304 stores output from the engine 302 based on spatial movement of the vehicle. For example, as the vehicle moves in a direction the queue 304 may be updated after a threshold amount of movement (e.g., 0.2 meters, 1 meter, 3 meters, and so on). Optionally, the threshold amount of movement may be based on a location or speed of the vehicle. For example, navigation on city streets may allow for pushing information to the queue 304 after less movement than navigation on a freeway (e.g., at higher speed). In some embodiments, the queue 304 may store information determined based on images taken at 10-time stamps, 12-time stamps, 20-time stamps, and so on.

Output from the feature queue engine 304 may be combined to form a tensor which is then processed by the remainder of the birds-eye view network 210. For example, the output 306A-N (e.g., spatially indexed features) may be provided to a video module 308. The video module 308 may represent a convolutional neural network, which may cause the processor system 120 to perform three-dimensional convolutions. In this way, the video module 308 may allow for tracking of objects over space (e.g., as the vehicle moves). In some embodiments, the video module may represent an attention network (e.g., spatial attention), a recurrent neural network, and so on.

With respect to video module 308, kinematic information 206 associated with the autonomous vehicle executing the vision-based machine learning model may optionally be input into the module 308. As described above, the kinematic information 206 may represent one or more of acceleration, velocity, yaw rate, turning information, braking information, and so on. The kinematic information 206 may additionally be associated with features 306A-N from the feature queue engine 304. Thus, the video module 308 may encode this kinematic information 206 for use in determining, as an example, positions of static objects.

For example, a particular road edge may be identified based on images processed by the birds-eye view network 210. In this example, the vehicle may move a particular amount with respect in three-dimensions which is determinable based on the kinematic information. Thus, the position of the particular road edge may be adjusted in current images obtained by the vehicle. The birds-eye view network 210 may therefore adjust the position of the particular road edge, for example even if occluded in the current images, based on the kinematic information 206.

Thus, the video module 308 may perform frame alignment. As described herein, frames may represent images (e.g., image frames) taken at a same time or substantially same time by the image sensors. Thus, the video module 308 may align frames taken at different times (e.g., the feature maps resulting from the frames). For example, frames may be selected according to their spatial index, and may be optionally aligned to correct for the autonomous vehicle's movement. For example, if the vehicle moved 20 meters ahead, then the video module 308 may select, or aggregate information which includes, frame(s) 20 meters earlier (e.g., in the past). In this example, the features of those earlier frame(s) may be spatially shifted to align with the current features which are 20 m ahead. This can be done longitudinally and laterally at the same time, to ensure views are consistent/aligned.

The birds-eye view network 210 includes one or more trunks 314A-314N which obtain information from the video module 308. For example, each trunk may obtain a portion, or all, of the output from the video module 308. In this example, each trunk may be trained to generate specific types of output. In some embodiments, the trunks may relate to edges, lines, dividers, islands, intersections, drivable space, restricted regions, road blockage, traffic flow, crosswalks, visibility, and so on. The trunks 314A-314N may be associated with one or more heads 316A-316N, 318A-318N, which output specific information for use by the autonomous vehicle. Example output from the heads 316A-316N, 318A-318N is illustrated in FIGS. 4A-4O.

As known by those skilled in the art, these trunks or heads (collectively referred to herein as heads) may extend from a common portion of a neural network and be trained as experts in determining specific information. In addition to being experts in specific information, the separation into different heads allows for piecemeal training to quickly incorporate new training data. As new training information is obtained, portions of the machine learning model which would most benefit from the training information may be quickly updated. In this example, the training information may represent images or video clips of specific real-world scenarios gathered by vehicles in real-world operation. Thus, a particular head or heads may be trained, and the weights included in these portions of the network may be updated. For example, other portions (e.g., earlier portions of the network) may not have weights updated to reduce a training time and time to updating end-user autonomous vehicles.

In some embodiments, training data which is directed to one or more of the heads or trunks may be adjusted to focus on those heads or trunks. For example, images may be masked (e.g., loss masked) such that only certain pixels of the images are supervised while otherwise are not supervised. In this example, certain pixels may be assigned a value of zero while other pixels may maintain their values or be assigned a value of one. Thus, if training images depict a rarely seen static object (e.g., a relatively new form of bike lane) then the training images may optionally be masked to focus on that static object. During training, the error generated may be used to train for the loss in the pixels which a labeler has associated with the static object. Thus, only a head or trunk associated with this type of static object may be updated.

To ensure that sufficient training data is obtained, the autonomous vehicles may optionally execute classifiers which are triggered to obtain images which satisfy certain conditions. For example, vehicles operated by end-users may automatically obtain training images which depict, for example, tire spray, rainy conditions, snow, fog, fire soke, and so on. Further description related to use of classifiers is described in U.S. Patent Pub. No. 2021/0271259 which is hereby incorporated herein by reference in its entirety as if set forth herein.

While the output described above, and in FIGS. 4A-4O, may represent images, or information which may be included in images (e.g., pixel values), in some embodiments additional information may be generated as output from the network 210. For example, road edges may be represented in an output image as values of specific pixels. In this example, a likelihood (e.g., a value between 0 and 1) of a pixel forming part of a road edge may be converted to grayscale. As may be appreciated, each pixel of the image may correspond to a portion of the real-world environment. For example, each pixel may correspond to an area of a threshold number of centimeters by a second threshold number of centimeters (e.g., 30 cm×30 cm, 10 cm×30 cm, 35 cm×15 cm, 33 cm×33 cm, and so on).

To reduce this coarseness, in some embodiments the network 210 may be trained to output an offset for each pixel. The offset may indicate how far from the center of a pixel the road edge is. The offset may additionally indicate a direction predicted which is associated with the offset. In this way, the finer detail may represent metrics or information which associated with the pixels of the output image. This information may be used to inform, at least, parking of the vehicle (e.g., the road edge may be curved such that finer accuracy is important). Additionally, the information may be used to determine how far from a road edge the vehicle is to ensure that maneuvers or driving actions are maintained to be smooth via use of enhanced clearance from the road edge.

Additional output may include connectivity information which is usable to indicate which lanes connect to which other lines (e.g., across an intersection). For example, a vehicle may be in the left-most lane in the vehicle's direction of travel (e.g., the right side of the road). In this example, the vehicle may be turning left across an intersection. Thus, the birds-eye view network 210 may determine which lanes across the intersection which connect to the vehicle's current lane. This connectivity may be generated as an image, for example the image of FIGS. 4M-4O.

In some embodiments, however, the connectivity may additionally be represented as splines which connect lanes. For example, the birds-eye view network 230 may, at times, drop parts of the connectivity due to occlusion or other reasons. Thus, in some embodiments, the network 230 (e.g., a specific head) may connect lines with splines. In this way, if a portion of the connectivity represented in an image drops then a spline connecting the vehicle's current line to another lane across an intersection may be relied upon (e.g., in combination with the image or alone).

Figure 3B:
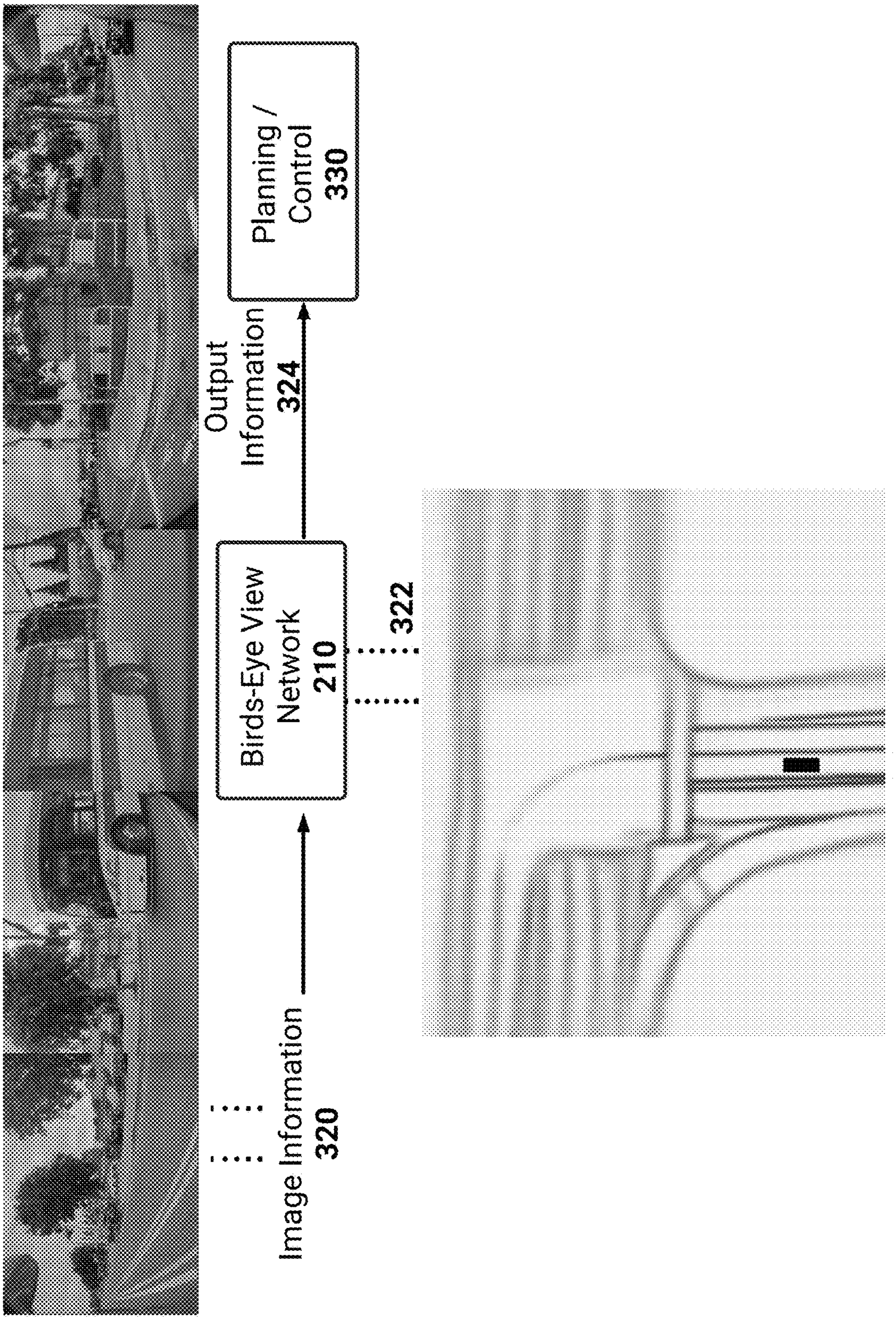
FIG. 3B is a block diagram illustrating an example birds-eye view associated with a virtual camera.

FIG. 3B is a block diagram illustrating an example birds-eye view associated with a virtual camera. In the illustrated example, image information 320 is being processed by the processor system 120 based on the birds-eye view network 230. As described in FIG. 3A, the processor system 120 maps information included in the image information 320 into a virtual camera space. For example, a birds-eye view 322 is included in FIG. 3B. Output 324 from the birds-eye view network 230 may be used by a planning/control engine 330 to navigate (e.g., autonomously navigate) the autonomous vehicle.

Block Diagram—Example Output

FIGS. 4A-4O represent example output from the birds-eye view network described herein. As described above, the output may be generated by different heads of the network. The output may optionally be images in which pixels are used to indicate information. For example, the pixels may be assigned colors, or gradations of colors (e.g., to indicate likelihoods), to indicate information. FIGS. 4A-4) may thus depict examples of static objects which are detectable by the birds-eye view network.

FIG. 4A illustrates an example output associated with the birds-eye view network. In the illustrated embodiment, image information 420 may be processed by the birds-eye view network 230 (e.g., by a processor system computing a forward pass through the network 230) to generate output image information 404. In FIG. 4A, the output 404 represents predicted external edges. For example, a vehicle 402 which includes the processor system 120 is depicted in the output 404. Proximate to the vehicle 402 are external road edges which are determined based on the image information 420 and projected into the birds-eye view vector space.

Figure 4B:
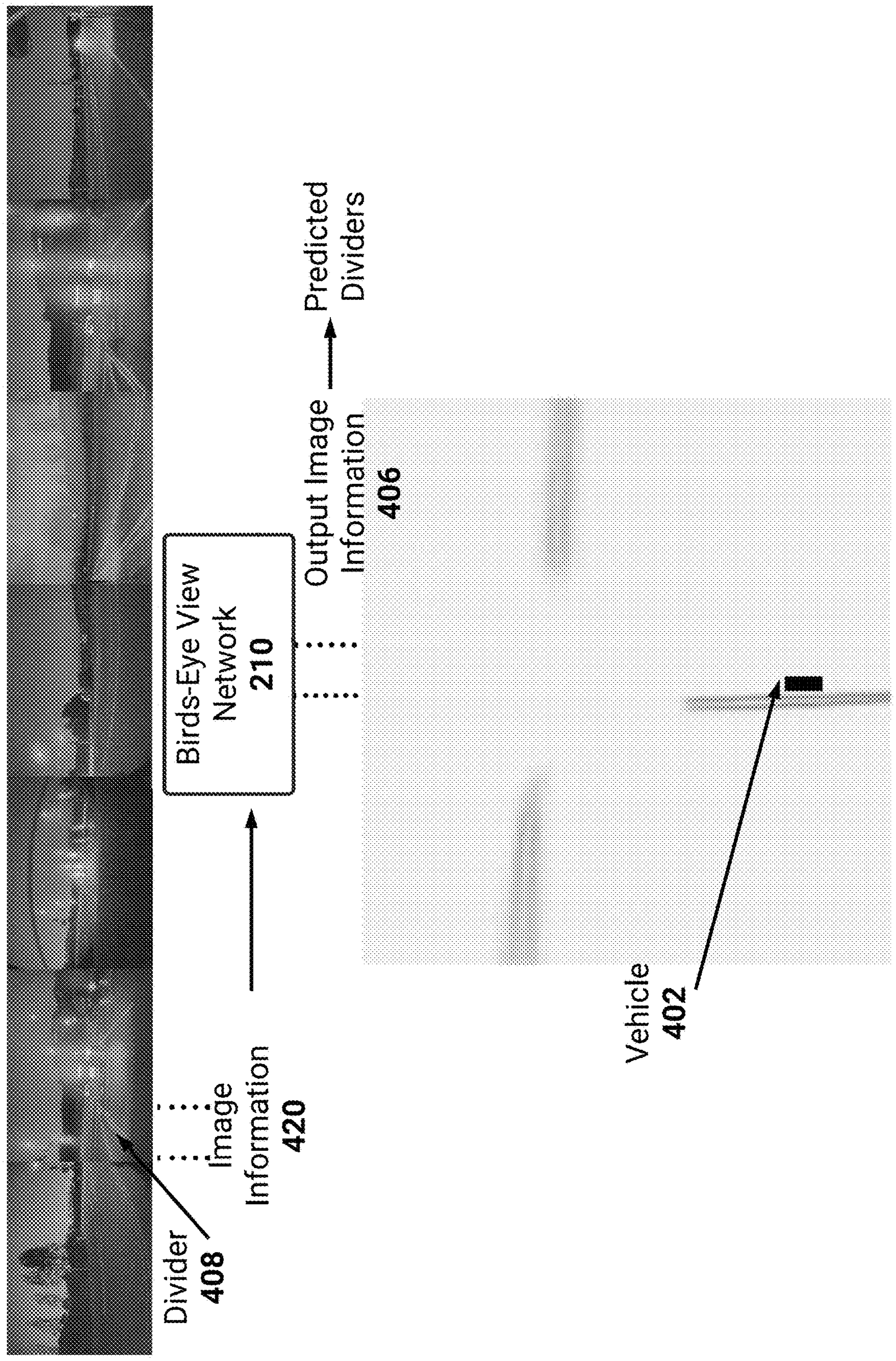
FIG. 4B illustrates another example output associated with the birds-eye view network.

FIG. 4B illustrates another example output associated with the birds-eye view network 230. In FIG. 4B, predicted dividers are represented in an output image 406 from the birds-eye view network 230. These dividers are evident in portions of the image information 420 (e.g., portion 408). As described above, the dividers, and other output information, may be determined based on information which is aggregated as the vehicle drives such that temporary occlusions do not impact the inclusion in the output image 406.

Figure 4C:
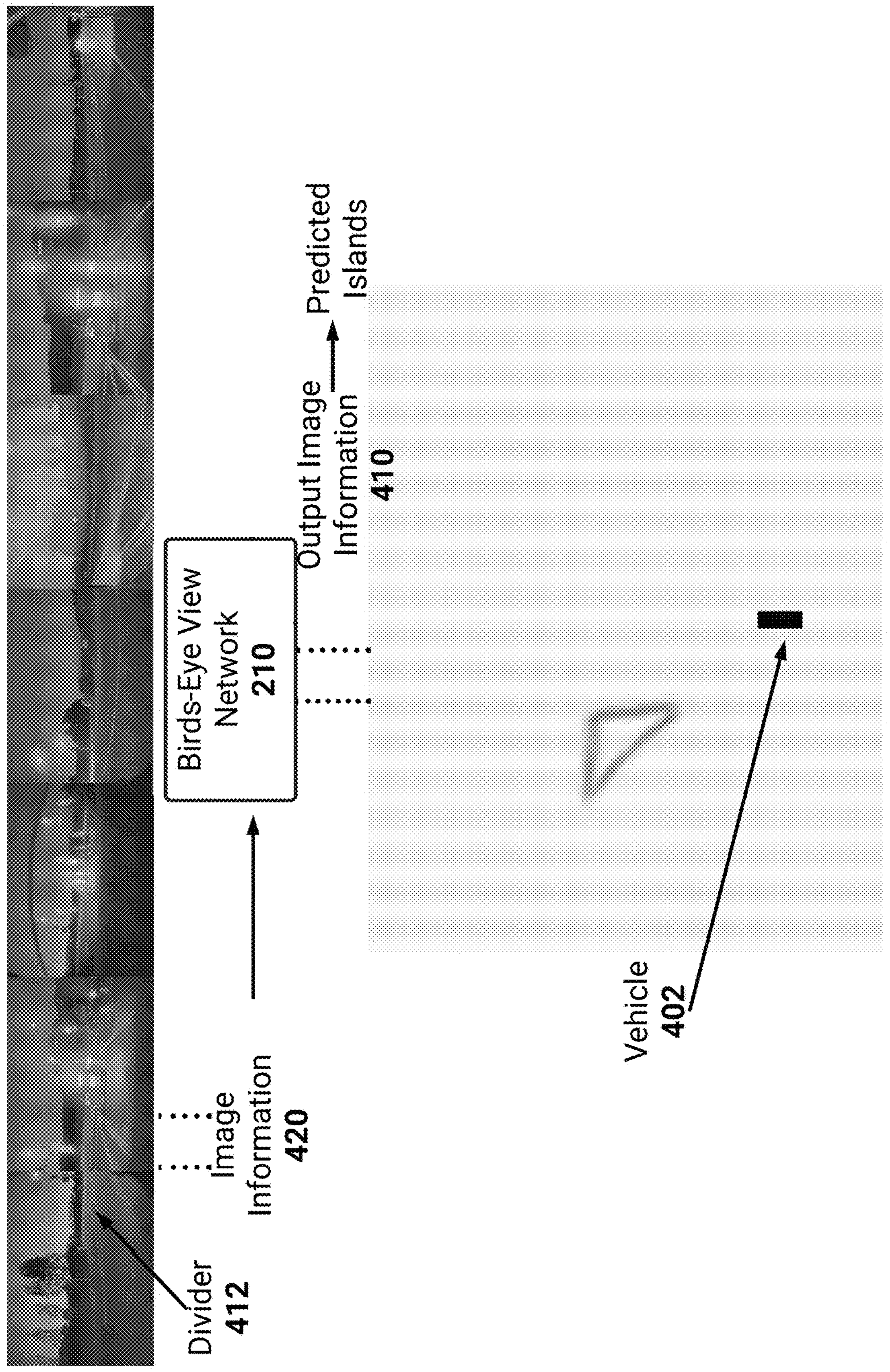
FIG. 4C illustrates another example output associated with the birds-eye view network.

FIG. 4C illustrates another example output associated with the birds-eye view network 230. In FIG. 4C, predicted islands are represented in an output image 410. An example divider is illustrated in the output image 410 and corresponds with a portion 412 of the image information 420.

Figure 4D:
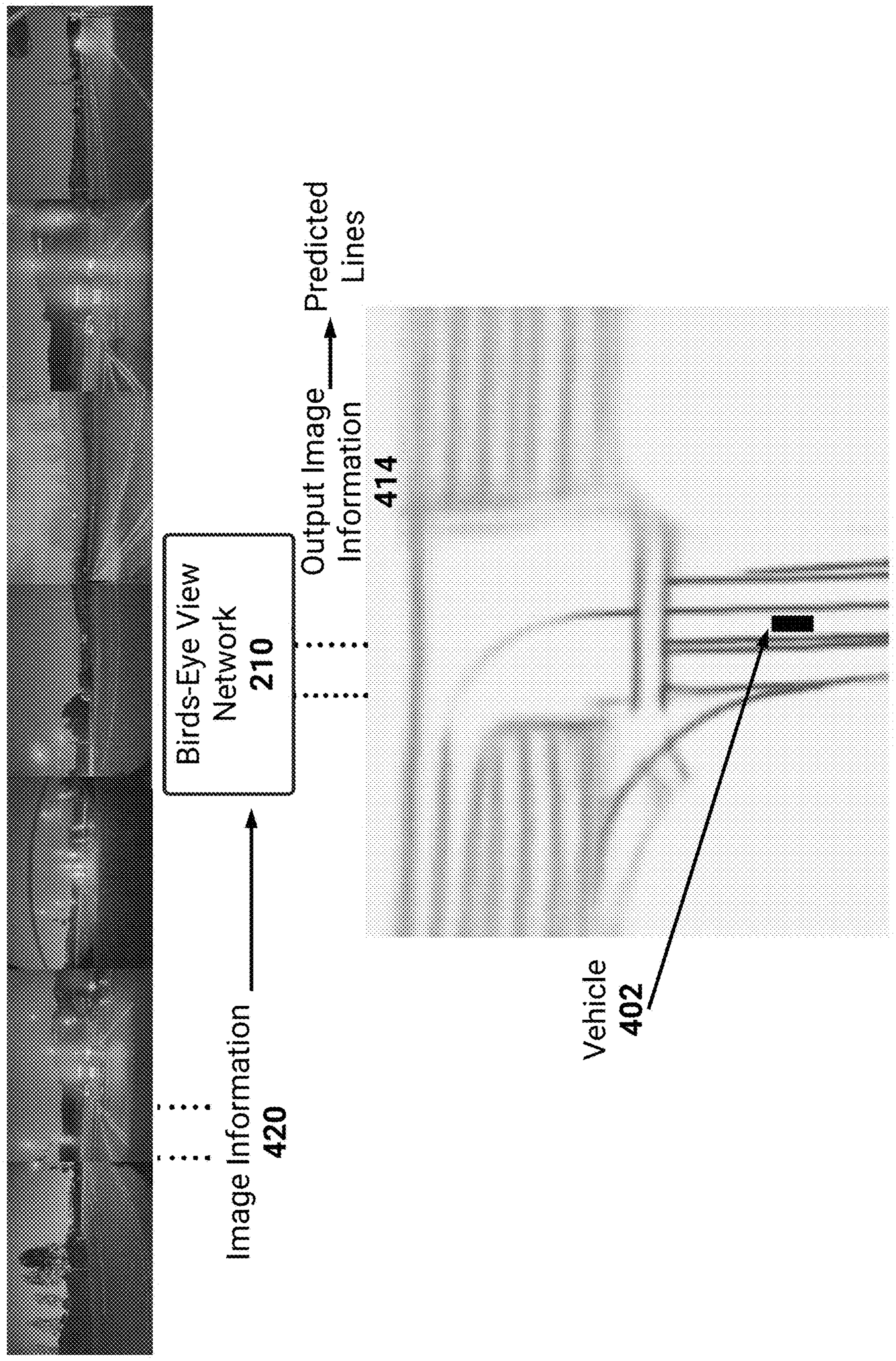
FIG. 4D illustrates another example output associated with the birds-eye view network.

FIG. 4D illustrates another example output associated with the birds-eye view network 230. In FIG. 4D, predicted lines are included in an output image 414. These predicted lines may represent, for example, road edges, road lines, bike lanes, and so on.

Figure 4E:
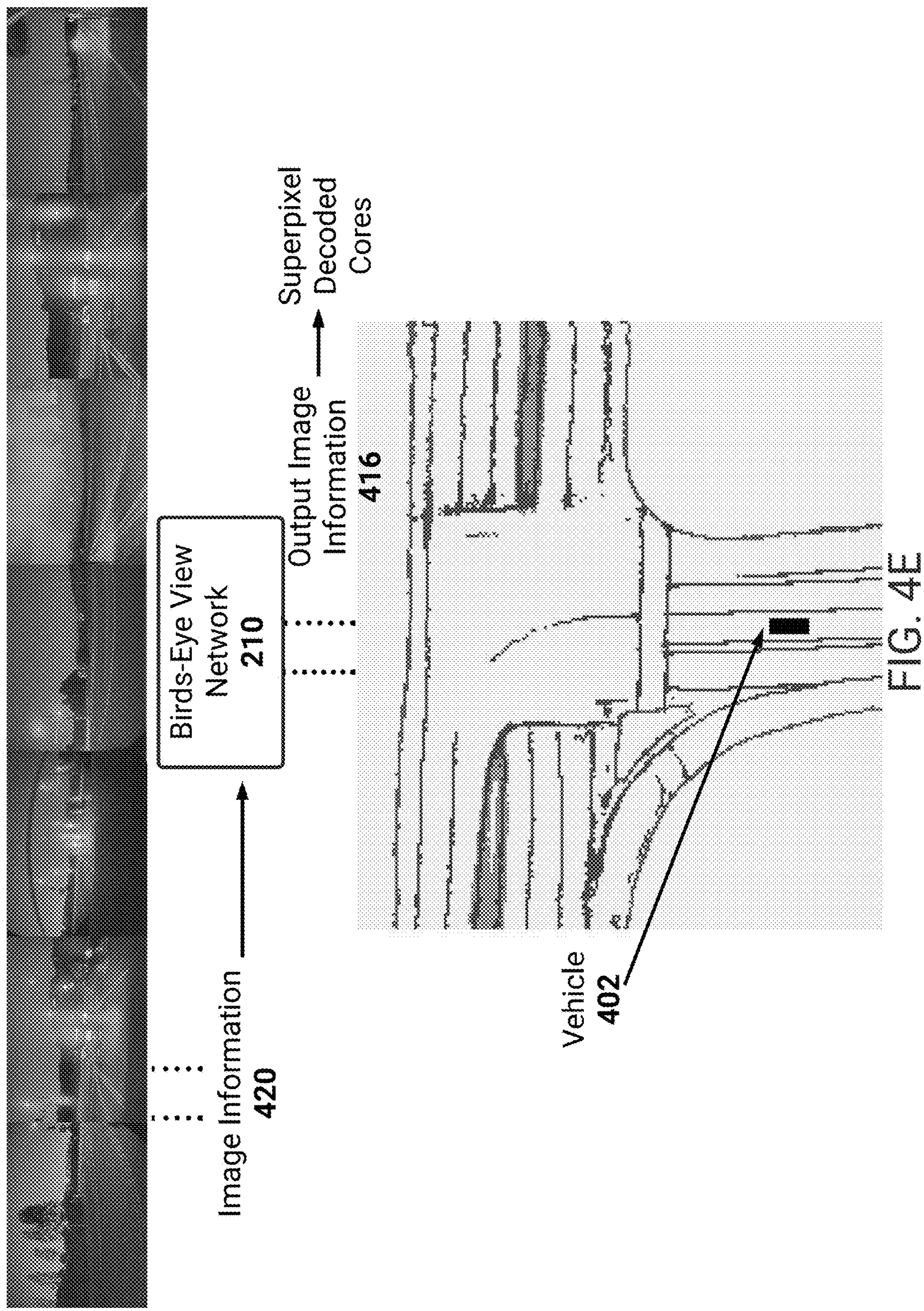
FIG. 4E illustrates another example output associated with the birds-eye view network.

FIG. 4E illustrates another example output associated with the birds-eye view network 230. In FIG. 4E, superpixel information is used to generate an output image 416. As described above, in some embodiments the birds-eye view network 230 may determine metrics indicating respective extents to which lines or edges are offset from pixels in an image included in the output information (e.g., intra-pixel precision). In some embodiments, these metrics may be associated with the image and used, for example, to inform planning and/or navigation of the autonomous vehicle. In some embodiments, the information may be used to refine the image.

Figure 4F:
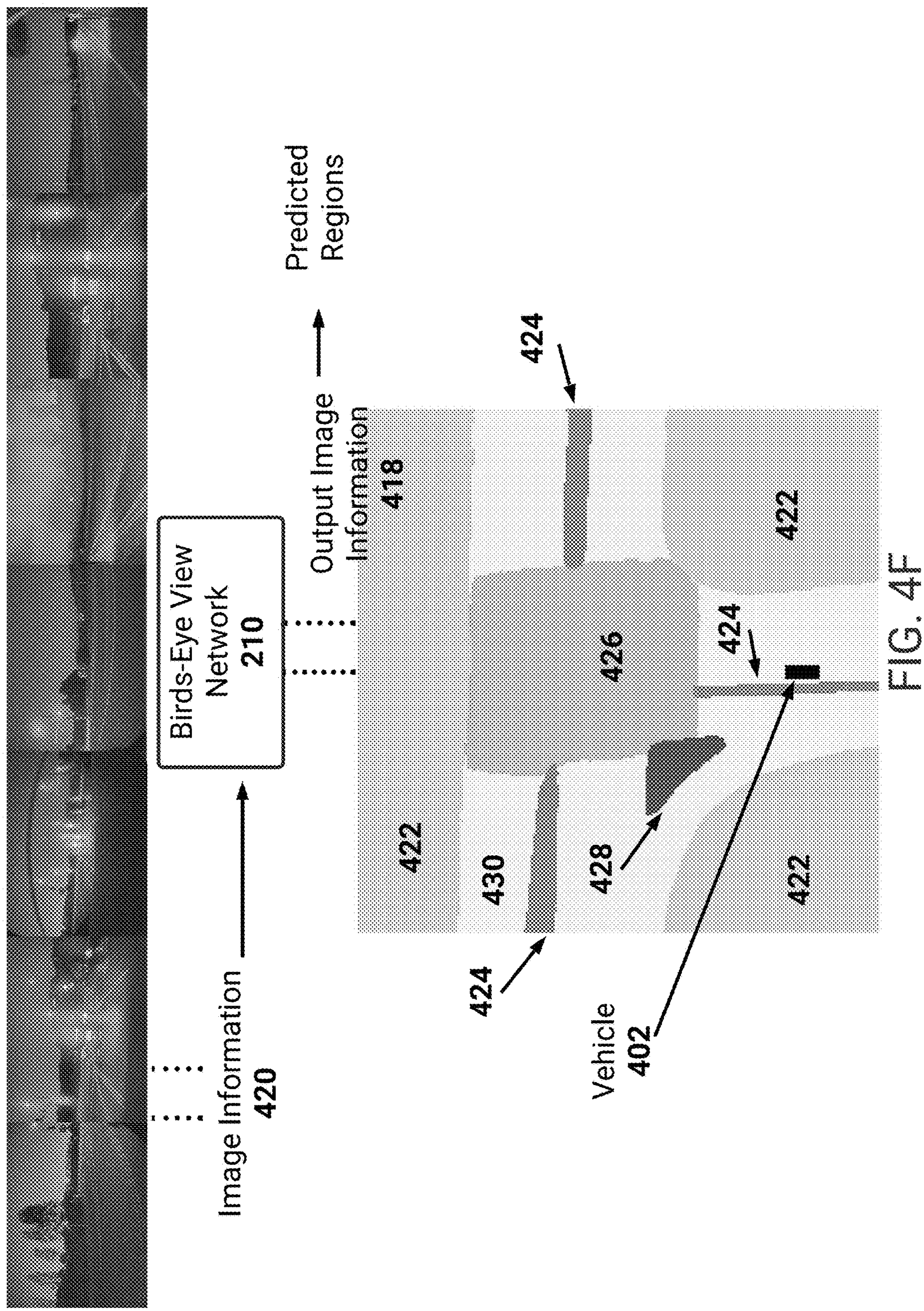
FIG. 4F illustrates another example output associated with the birds-eye view network.

FIG. 4F illustrates another example output associated with the birds-eye view network 230. In FIG. 4F, the birds-eye view network 230 has generated an image 418 indicative of predicted regions. For example, a first region 422 may indicate non-drivable space. As another example, a second region 424 may indicate lane dividers. As another example, a third region 426 may indicate an intersection. As another example, a fourth region 428 may indicate an island. As another example, a fifth region 430 may indicate drivable space. These different regions may be assigned different colors by the network 230.

Figure 4G:
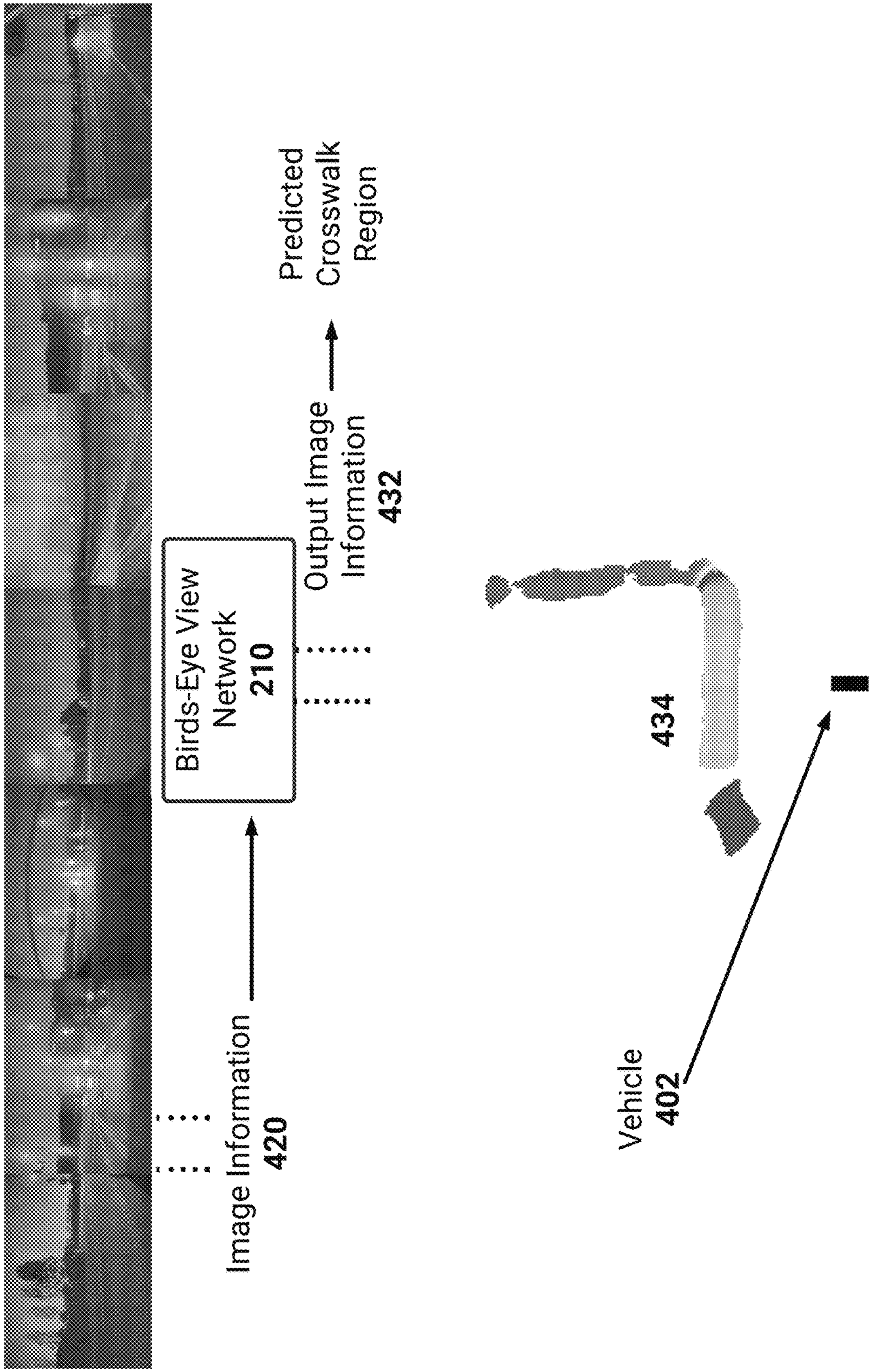
FIG. 4G illustrates another example output associated with the birds-eye view network.

FIG. 4G illustrates another example output associated with the birds-eye view network 230. In FIG. 4G, the birds-eye view network 230 has generated an image 432 which indicates crosswalk regions. In some embodiments, colors may be assigned to the crosswalk region 434 to indicate what angle (e.g., a vector) that pedestrians are expected to walk in. Thus, a first color may indicate that pedestrians are to walk between left and right while a second color may indicate that pedestrians are to walk between top and bottom.

Figure 4H:
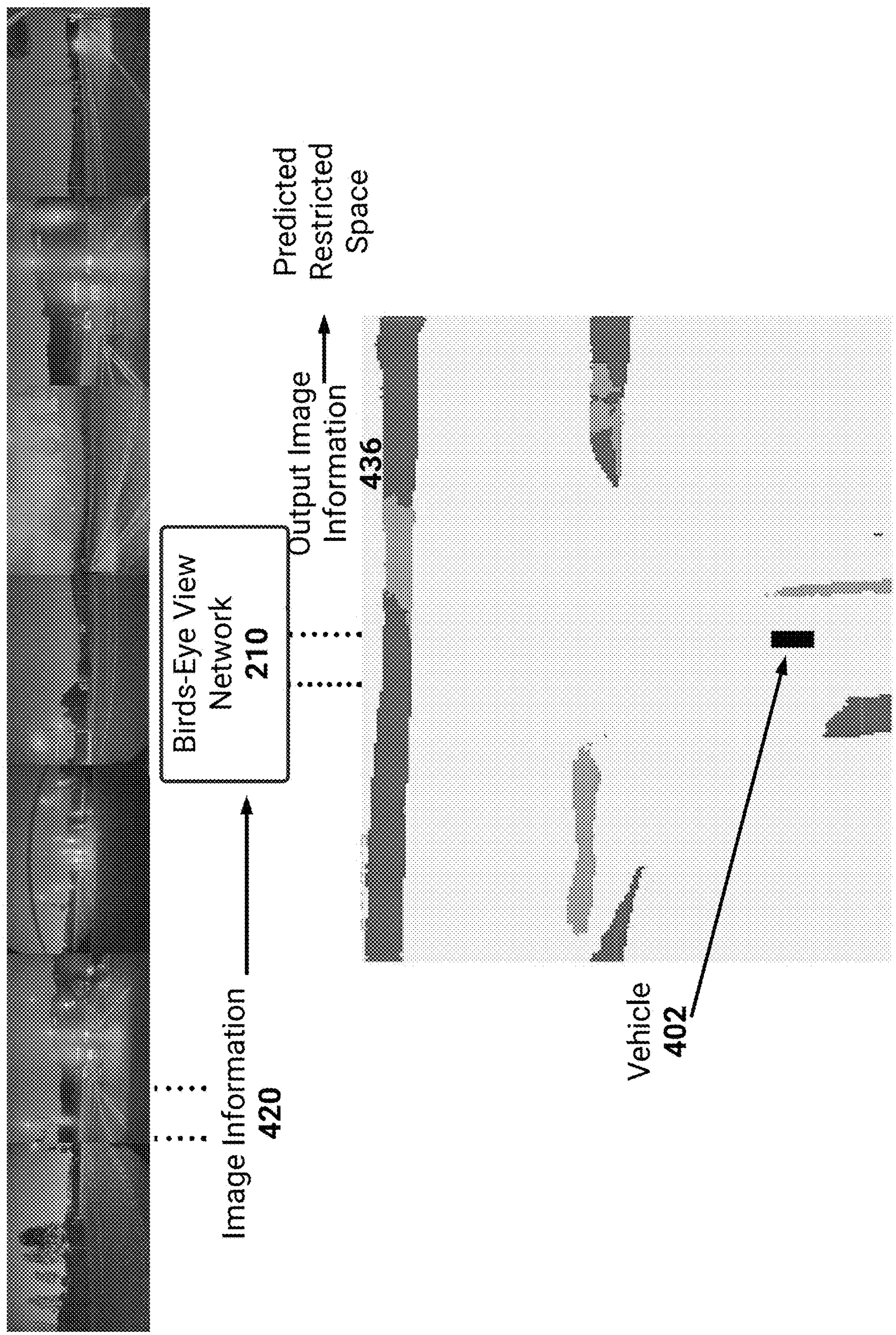
FIG. 4H illustrates another example output associated with the birds-eye view network.

FIG. 4H illustrates another example output associated with the birds-eye view network 230. In FIG. 4H, the birds-eye view network 230 has generated an image 436 which indicates predicted restricted space. Restricted space may indicate, for example, portions which the autonomous vehicle is not able to drive in. For example, bike lanes, sidewalks, and so on, may be included in the image 436 optionally in distinct colors.

Figure 4I:
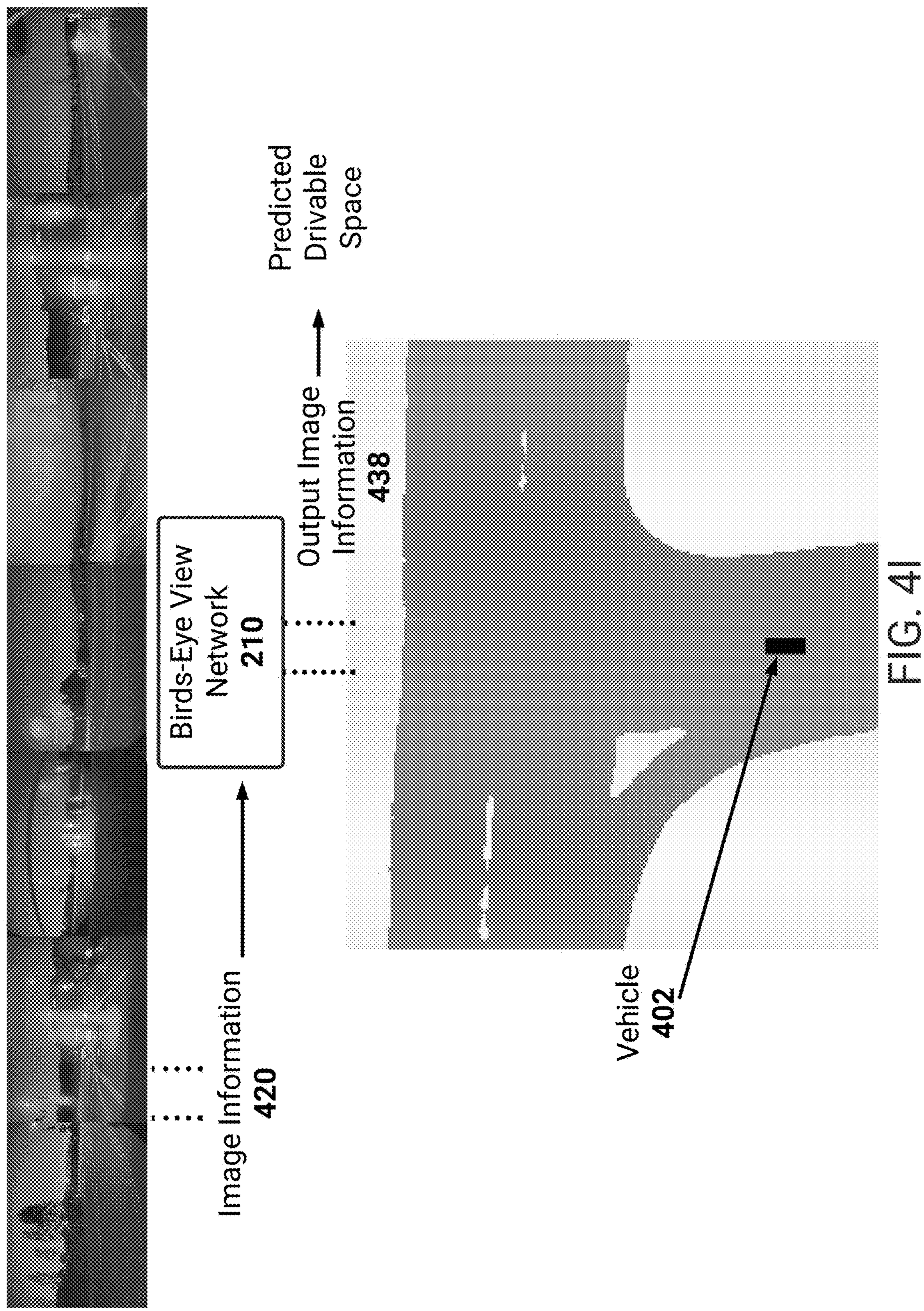
FIG. 4I illustrates another example output associated with the birds-eye view network.
Figure 4J:
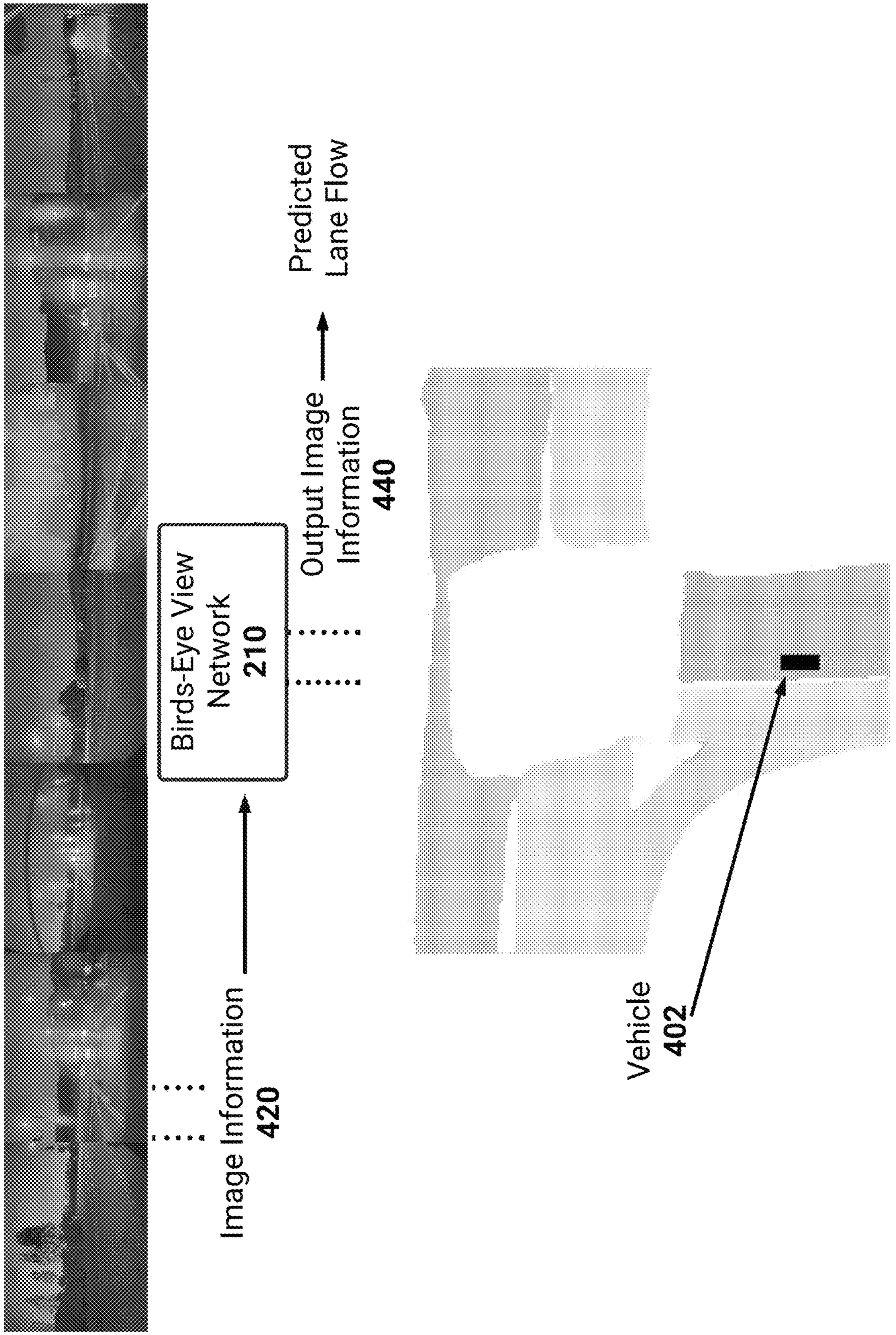
FIG. 4J illustrates another example output associated with the birds-eye view network.

FIG. 4I illustrates another example output associated with the birds-eye view network 230. In FIG. 4I, the birds-eye view network 230 has generated an image 438 which indicates predicted drivable space. Thus, the image 438 may indicate road portions.

FIG. 4J illustrates another example output associated with the birds-eye view network 230. In FIG. 4J, the birds-eye view network 230 has generated an image 440 which indicates predicted lane flow. The image 440 may indicate, for each pixel, which direction cars are moving towards. For example, the image 440 may include different colors indicating different flow directions. As an example, a first color may indicate movement to the left, a second color may indicate movement to the right, a third color may indicate movement up, a fourth color may indicate movement down, and so on. The intersection may optionally not be assigned a color as the lane flow is invalid.

Figure 4K:
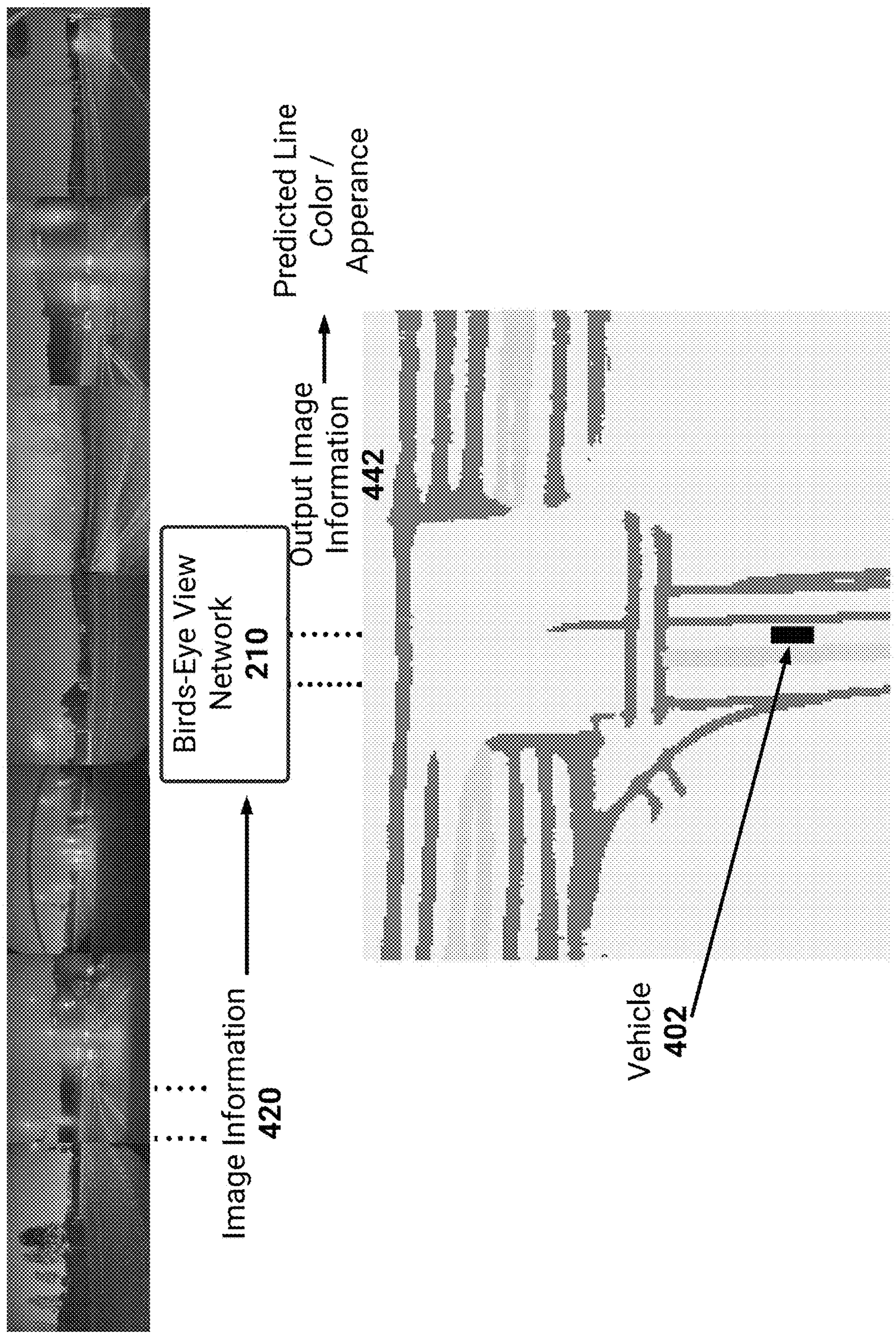
FIG. 4K illustrates another example output associated with the birds-eye view network.

FIG. 4K illustrates another example output associated with the birds-eye view network 230. In FIG. 4K, the birds-eye view network 230 has generated an image 442 which indicates road line color and/or appearance. With respect to color, the image 442 may indicate while road lines, yellow road lines, and so on. With respect to appearance, the image 442 may indicate dotted lines, double lines, single lines, and so on.

Figure 4L:
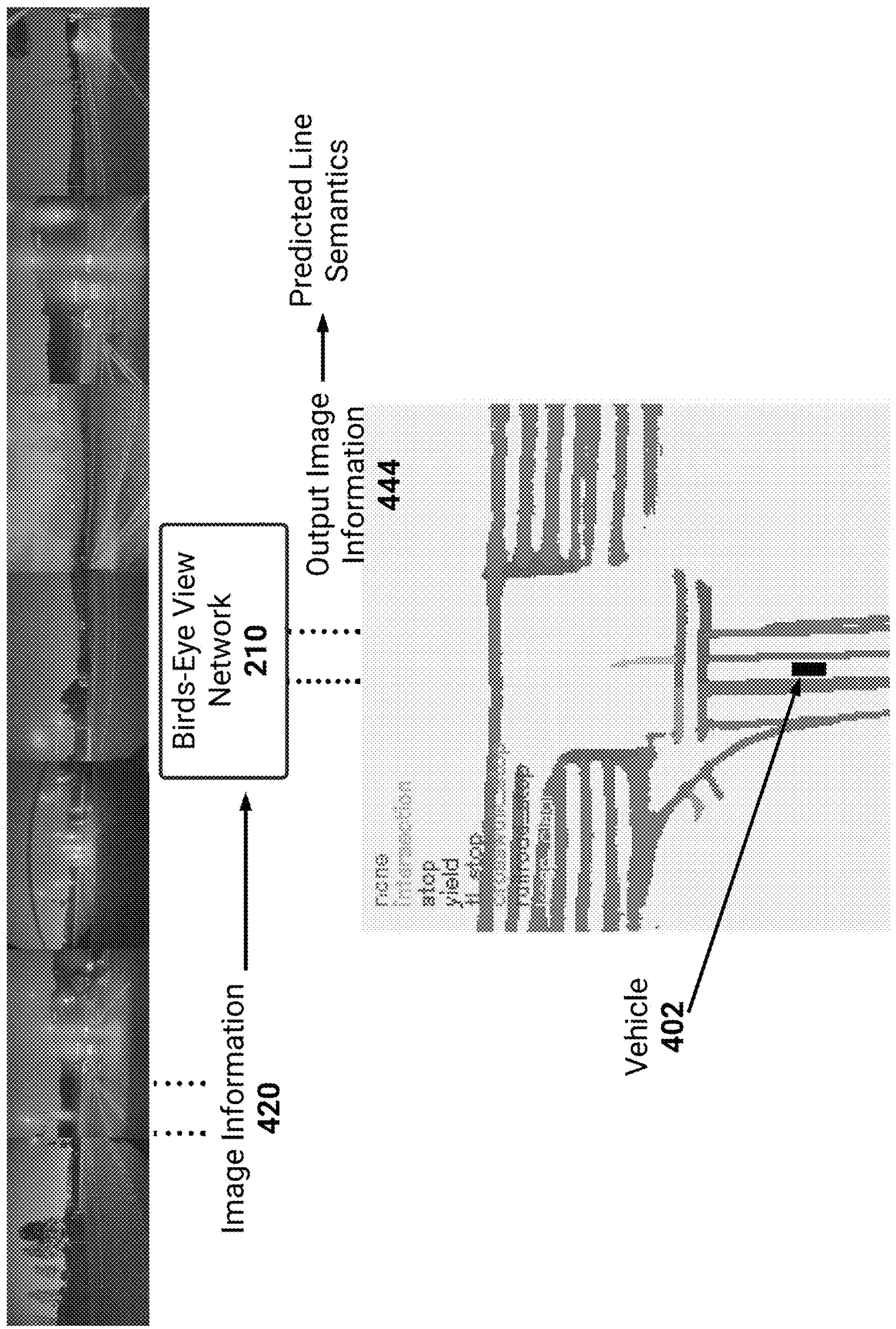
FIG. 4L illustrates another example output associated with the birds-eye view network.

FIG. 4L illustrates another example output associated with the birds-eye view network 230. In FIG. 4L, the birds-eye view network 230 has generated an image 444 which indicates line semantics. For example, lines associated with an intersection, stop sign, yield sign, crosswalk stop, railroad stop, keep clear, and so on, may be included in the image 444 optionally with different colors.

Figure 4M:
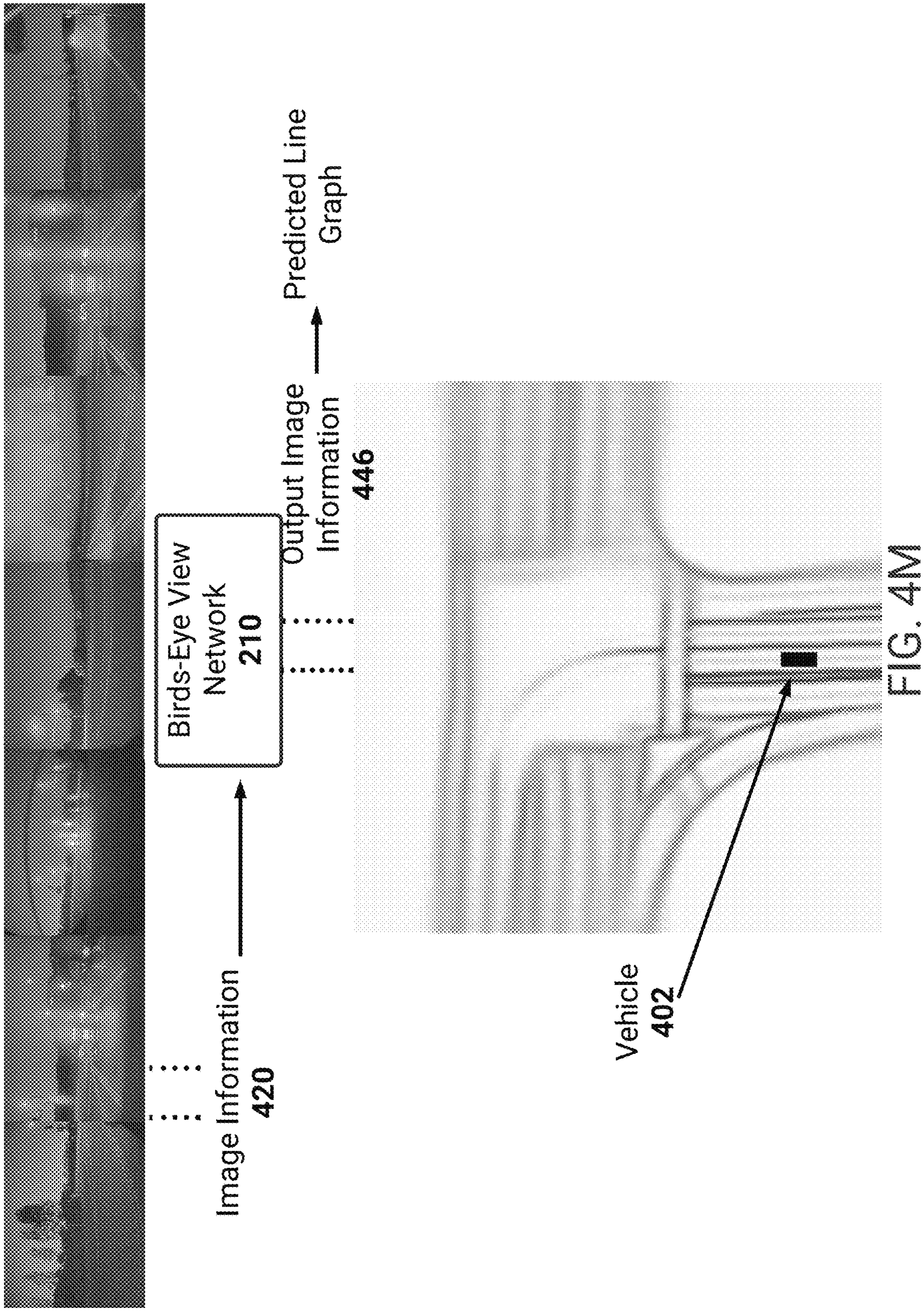
FIG. 4M illustrates another example output associated with the birds-eye view network.

FIG. 4M illustrates another example output associated with the birds-eye view network 230. In FIG. 4M, the birds-eye view network 230 has generated an image 446 which may aggregate disparate information associated with lines. For example, bike lanes, medians, islands, intersections, lane connectivity information, and so on, may be included in the image 446 optionally with different colors.

Figure 4N:
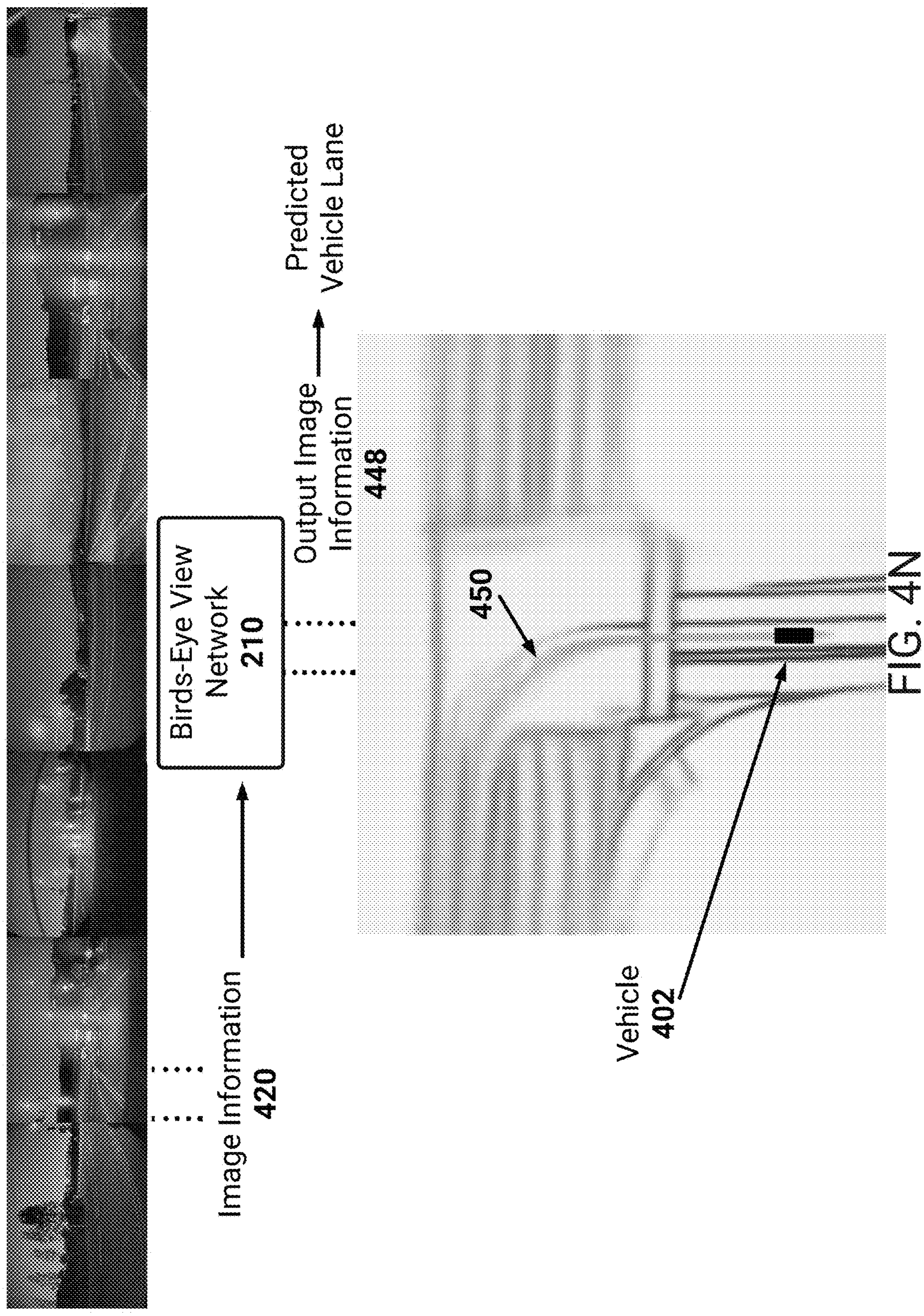
FIG. 4N illustrates another example output associated with the birds-eye view network.
Figure 40:
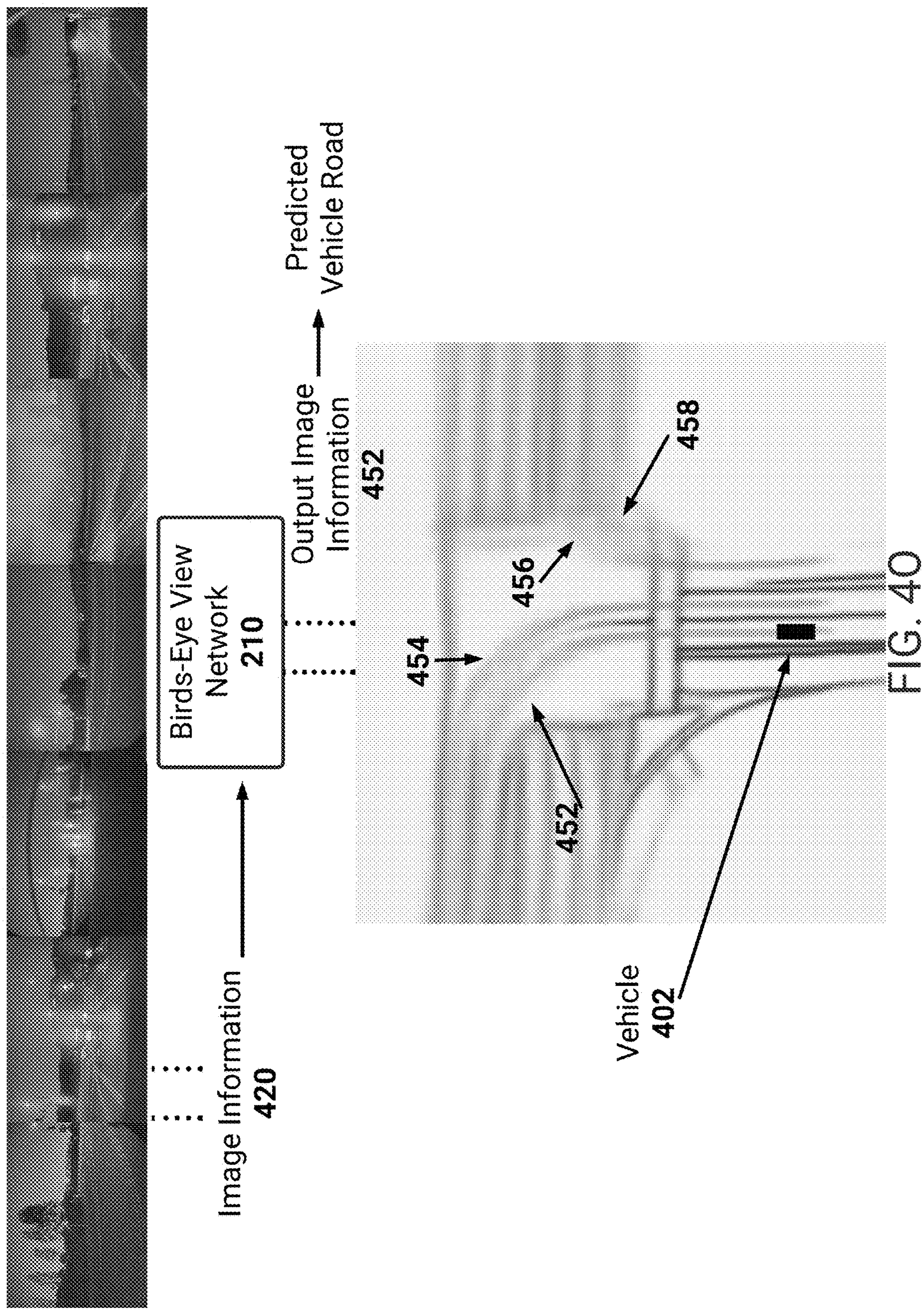

FIG. 4N illustrates another example output associated with the birds-eye view network 230. In FIG. 4N, the birds-eye view network 230 has generated an image 448 which identifies potential connections between a current lane of the autonomous vehicle and one or more lanes across an intersection. For example, a particular color may indicate the connections (e.g., connection 450).

FIG. 4O illustrates another example output associated with the birds-eye view network 230. In FIG. 4O, the birds-eye view network 230 has generated an image 452 which identifies connections between a current road of the autonomous vehicle and proximate roads. For example, the connections include connections 452-454 to the road in the upper left part of the image 452. The connections also include connections 456-458 in the lower right part of the image 452.

Example Flowchart

Figure 5:
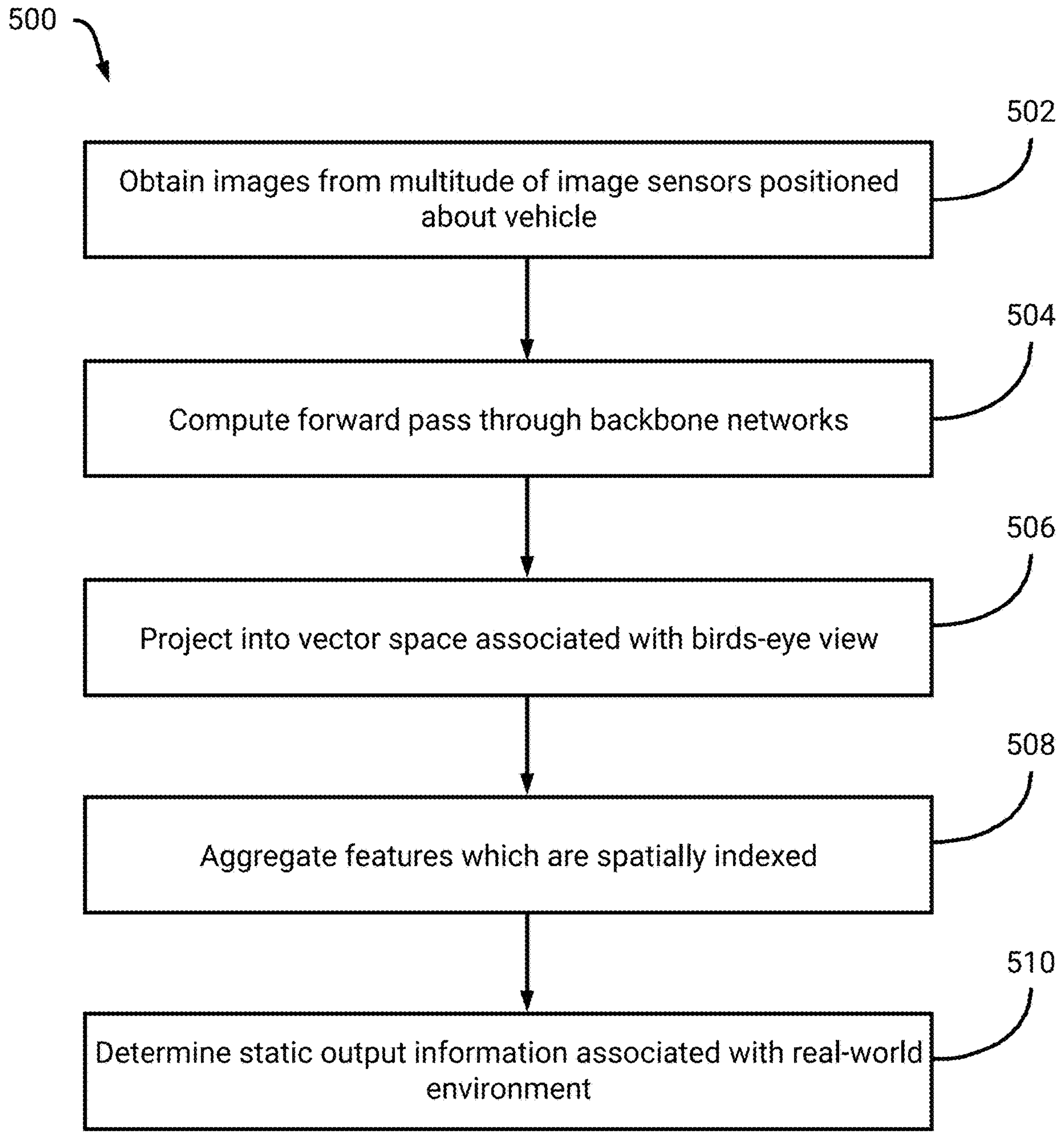
FIG. 5 is a flowchart of an example process for determining static information positioned about an autonomous or semi-autonomous vehicle using a vision-based machine learning model.

FIG. 5 is a flowchart of an example process 500 for determining static information positioned about an autonomous or semi-autonomous vehicle using a vision-based machine learning model. For convenience, the process 500 will be described as being performed by a system of one or more processors (e.g., the processor system 120, which may be included in a vehicle).

At block 502, the system obtains images from multitude of image sensors positioned about a vehicle. As described above, there may be 7, 8, 10, and so on, image sensors used to obtain images. At block 504, the system computes a forward pass-through backbone networks. The backbone networks may represent convolutional neural networks which optionally pre-process the images (e.g., rectify the images, crop the images, and so on).

At block 506, the system projects features determined from the images into a birds-eye view. For example, a transformer network included in a birds-eye view model may project the features into a consistent vector space. In this example, the transformer network may be trained to associate features extracted from the images into the birds-eye view projection. Optionally, a forced projection step may precede the transformer network to, at least in part, cause the projection into the birds-eye view.

At block 508, the system aggregates spatially indexed features. As described above, a video module included in the birds-eye view network may be used to aggregate information which is determined within a threshold distance from the vehicle's location. For example, the video module may obtain features from a spatially indexed queue which were determined over the previous 50 meters, 75 meters, 100 meters, and so on.

At block 510, the system determines static output information associated with a. real-world environment in which the vehicle is driving. For example, different trunks and heads included in the birds-eye view network may be used to generate the output information.

In some embodiments, the information (e.g., the images described herein) determined by the birds-view network may be presented in a display of the vehicle. For example, the information may be used to inform autonomous driving (e.g., used by a planning and/or navigation engine) and optionally presented as a visualization for a driver or passenger to view. In some embodiments, the information may be used only as a visualization. For example, the driver or passenger may toggle an autonomous mode off. The visualization may also represent a rendering based on the information. For example, three-dimensional graphics of objects (e.g., lane lanes, bike lanes) may be rendered based on positional information determined by the birds-eye view network.

Vehicle Block Diagram

Figure 6:
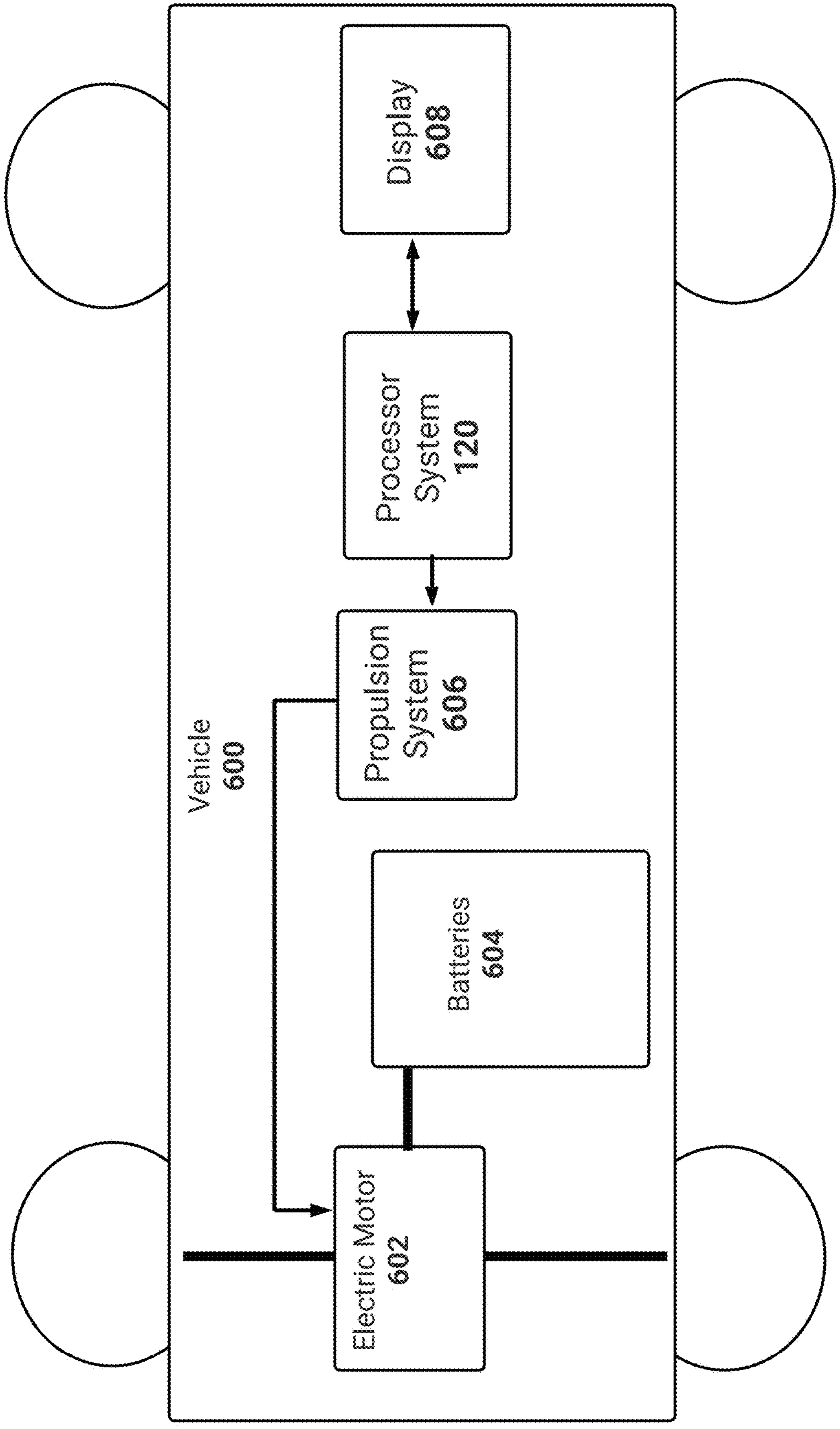
FIG. 6 is a block diagram illustrating an example vehicle which includes the example processor system.

FIG. 6 illustrates a block diagram of a vehicle 600 (e.g., vehicle 100). The vehicle 600 may include one or more electric motors 602 which cause movement of the vehicle 600. The electric motors 602 may include, for example, induction motors, permanent magnet motors, and so on. Batteries 604 (e.g., one or more battery packs each comprising a multitude of batteries) may be used to power the electric motors 602 as is known by those skilled in the art.

The vehicle 600 further includes a propulsion system 606 usable to set a gear (e.g., a propulsion direction) for the vehicle. With respect to an electric vehicle, the propulsion system 606 may adjust operation of the electric motor 602 to change propulsion direction.

Additionally, the vehicle includes the processor system 120 which processes data, such as images received from image sensors 102A-102F positioned about the vehicle 600. The processor system 120 may additionally output information to, and receive information (e.g., user input) from, a display 608 included in the vehicle 600. For example, the display may present graphical depictions of static objects positioned about the vehicle 600.

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a vehicle processor system, the method comprising:
- obtaining images from a multitude of image sensors positioned about a vehicle;
- determining features associated with the images, wherein the features are output based on a forward pass through a machine learning model;
- projecting, based on the machine learning model, the features into a vector space associated with a birds-eye view;
- storing the projected features in a queue, wherein the queue spatially or temporally indexes information;
- updating the queue based on the vehicle meeting a spatial threshold, wherein the spatial threshold is dynamically adjusted based on a speed of the vehicle and a location environment of the vehicle, wherein the spatial threshold is reduced in response to the location environment when the location environment corresponds to a lower speed and increased when the location environment corresponds to a higher speed;
- aggregating, based on the updated queue, the projected features with other projected features associated with prior images; and
- outputting, based on a plurality of heads of the machine learning model using the aggregated projected features and the other projected features, images depicting static objects in the birds-eye view.

2. The method of claim 1, wherein the birds-eye view represents a top-down view in which static objects are positioned about a location of the vehicle.

3. The method of claim 1, wherein each image sensor is associated with a backbone network, and wherein the backbone network represents a portion of the machine learning model which determines a portion of the features which are associated with an individual image sensor.

4. The method of claim 3, wherein the features are projected into the vector space based on an attention network, and wherein the attention network receives an aggregated input of the features from the backbone networks.

5. The method of claim 1, wherein the machine learning model is a hydra network in which a plurality of trunks receives respective portions of output from aggregating the projected features, and wherein each head is associated with an individual trunk.

6. The method of claim 1, wherein a first image of the output images includes pixels which are assigned values based on likelihoods of the pixels depicting road edges.

7. The method of claim 1, wherein a second image of the output images includes pixels which are assigned respective colors, and wherein each color is indicative of a direction of travel.

8. The method of claim 1, wherein a third image of the output images depicts connections between a lane in which the vehicle is located with one or more other lanes across an intersection.

9. The method of claim 8, wherein the machine learning model determines splines which connect the lane with the other lanes.

10. The method of claim 1, wherein the spatial threshold is based on a distance between the vehicle and at least one of the features.

11. A system comprising one or more processors and non-transitory computer storage media storing instructions that when executed by the one or more processors, cause the processors to perform operations, wherein the system is included in an autonomous or semi-autonomous vehicle, and wherein the operations comprise:

- obtaining images from a multitude of image sensors positioned about a vehicle;
- determining features associated with the images, wherein the features are output based on a forward pass through a machine learning model;
- projecting, based on the machine learning model, the features into a vector space associated with a birds-eye view;
- storing the projected features in a queue, wherein the queue spatially or temporally indexes information;
- updating the queue based on the vehicle meeting a spatial threshold, wherein the spatial threshold is dynamically adjusted based on a speed of the vehicle and a location environment of the vehicle, wherein the spatial threshold is reduced in response to the location environment when the location environment corresponds to a lower speed and increased when the location environment corresponds to a higher speed;
- aggregating, based on the updated queue, the projected features with other projected features associated with prior images; and
- outputting, based on a plurality of heads of the machine learning model using the aggregated projected features and the other projected features, images depicting static objects in the birds-eye view.

12. The system of claim 11, wherein the birds-eye view represents a top-down view in which static objects are positioned about a location of the vehicle.

13. The system of claim 11, wherein each image sensor is associated with a backbone network, and wherein the backbone network represents a portion of the machine learning model which determines a portion of the features which are associated with an individual image sensor.

14. The system of claim 13, wherein the features are projected into the vector space based on an attention network, and wherein the attention network receives an aggregated input of the features from the backbone networks.

15. The system of claim 11, wherein a first image of the output images includes pixels which are assigned values based on likelihoods of the pixels depicting road edges.

16. The system of claim 11, wherein a second image of the output images includes pixels which are assigned respective colors, and wherein each color is indicative of a direction of travel.

17. The system of claim 11, wherein a third image of the output images depicts connections between a lane in which the vehicle is located with one or more other lanes across an intersection.

18. The system of claim 17, wherein the machine learning model determines splines which connect the lane with the other lanes.

19. Non-transitory computer storage media storing instructions that when executed by a system of one or more processors which are included in an autonomous or semi-autonomous vehicle, cause the system to perform operations comprising:

- obtaining images from a multitude of image sensors positioned about a vehicle;
- determining features associated with the images, wherein the features are output based on a forward pass through a machine learning model;
- projecting, based on the machine learning model, the features into a vector space associated with a birds-eye view;
- storing the projected features in a queue, wherein the queue spatially or temporally indexes information;
- updating the queue based on the vehicle meeting a spatial threshold, wherein the spatial threshold is dynamically adjusted based on a speed of the vehicle and a location environment of the vehicle, wherein the spatial threshold is reduced in response to the location environment when the location environment corresponds to a lower speed and increased when the location environment corresponds to a higher speed;
- aggregating, based on the updated queue, the projected features with other projected features associated with prior images; and
- outputting, based on a plurality of heads of the machine learning model using the aggregated projected features and the other projected features, images depicting static objects in the birds-eye view.

* * * * *